United States Patent
Inui

(10) Patent No.: US 10,154,172 B2
(45) Date of Patent: Dec. 11, 2018

(54) PRINTING APPARATUS, CONTROL METHOD THEREOF, AND STORAGE MEDIUM STORING A PROGRAM THAT SET A SIZE AND AN ORIENTATION OF AN ENVELOPE BASED ON A USER INSTRUCTION

(71) Applicant: CANON KABUSHIKI KAISHA, Tokyo (JP)

(72) Inventor: Masanobu Inui, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/374,663

(22) Filed: Dec. 9, 2016

(65) Prior Publication Data
US 2017/0094109 A1    Mar. 30, 2017

Related U.S. Application Data

(63) Continuation of application No. 14/636,023, filed on Mar. 2, 2015, now Pat. No. 9,536,181, which is a
(Continued)

(30) Foreign Application Priority Data

Dec. 1, 2011 (JP) ................. 2011-264121

(51) Int. Cl.
*G06F 15/00* (2006.01)
*H04N 1/387* (2006.01)
(Continued)

(52) U.S. Cl.
CPC ............. *H04N 1/3872* (2013.01); *B65H 1/04* (2013.01); *B65H 5/00* (2013.01); *B65H 7/20* (2013.01);
(Continued)

(58) Field of Classification Search
CPC .......... H04N 1/0057; H04N 2201/0094; B65H 2701/1916; B65H 5/00; B65H 2511/12; B65H 2511/51; G06K 2215/0097
(Continued)

(56) References Cited

U.S. PATENT DOCUMENTS 3,951,264 A   4/1976  Heidecker et al.
5,154,405 A   10/1992 Graveson et al.
(Continued)

FOREIGN PATENT DOCUMENTS

CN   1206680 A   2/1999
CN   1453652 A   11/2003
(Continued)

*Primary Examiner* — Saeid Ebrahimi Dehkordy
(74) *Attorney, Agent, or Firm* — Fitzpatrick, Cella, Harper & Scinto

(57) ABSTRACT

An image forming apparatus includes a stacker on which an envelope is to be stacked, an image forming device to form an image on the envelope conveyed from the stacker, an operation device to display a screen for prompting a user to set a size of the envelope and an orientation of the envelop to be stacked on the stacker. The orientation of the envelope accepted by the operation device is one of a first orientation, in which the flap and the body portion are aligned in a width direction that is orthogonal to a conveyance direction of the envelope, and a second orientation, in which the flap and the body portion are aligned in the conveyance direction of the envelope. A controller controls the operation device to display a guidance image based on the size of the envelope and the orientation of the envelope accepted by the operation device.

13 Claims, 24 Drawing Sheets

Related U.S. Application Data continuation of application No. 13/674,876, filed on Nov. 12, 2012, now Pat. No. 8,988,724.

(51) Int. Cl.

| | | |
|---|---|---|
| *B65H 5/00* | (2006.01) | |
| *B65H 1/04* | (2006.01) | |
| *G03G 15/00* | (2006.01) | |
| *B65H 7/20* | (2006.01) | |
| *G06K 15/02* | (2006.01) | |
| *G06K 15/16* | (2006.01) | |
| *H04N 1/00* | (2006.01) | |

(52) U.S. Cl.
CPC ..... *G03G 15/5095* (2013.01); *G03G 15/6594* (2013.01); *G06K 15/021* (2013.01); *G06K 15/16* (2013.01); *G06K 15/1868* (2013.01); *G06K 15/1885* (2013.01); *H04N 1/0057* (2013.01); *B65H 2407/21* (2013.01); *B65H 2511/12* (2013.01); *B65H 2511/22* (2013.01); *B65H 2511/51* (2013.01); *B65H 2701/1916* (2013.01); *G06K 2215/0097* (2013.01); *H04N 2201/0094* (2013.01)

(58) Field of Classification Search
USPC .......................................... 358/1.18
See application file for complete search history.

(56) References Cited

U.S. PATENT DOCUMENTS

| | | | |
|---|---|---|---|
| 5,999,765 | A | 12/1999 | Tomita |
| 6,179,288 | B1 | 1/2001 | Bezelga et al. |
| 6,234,468 | B1 | 5/2001 | Janatka et al. |
| 6,356,719 | B1 | 3/2002 | Yoshiura |
| 6,559,970 | B1 * | 5/2003 | Yamamoto ............ B65D 27/14 229/69 |
| 6,688,593 | B1 | 2/2004 | Auerbach |
| 6,895,195 | B2 | 5/2005 | Katamoto |
| 6,982,808 | B1 | 1/2006 | Ogg et al. |
| 7,079,781 | B2 | 7/2006 | Suzuki et al. |
| 7,284,753 | B2 | 10/2007 | Kotani |
| 7,510,182 | B2 | 3/2009 | Bobrow |
| 7,841,594 | B2 | 11/2010 | Janatka et al. |
| 8,305,608 | B2 | 11/2012 | Saito |
| 8,330,783 | B2 | 12/2012 | Salvestro |
| 8,523,165 | B2 | 9/2013 | Kunieda et al. |
| 2007/0165101 | A1 | 7/2007 | Makino |
| 2008/0260406 | A1 | 10/2008 | Sone et al. |
| 2009/0230607 | A1 * | 9/2009 | Masui ................. B65H 7/20 271/8.1 |
| 2010/0053696 | A1 * | 3/2010 | Sasano ................ H04N 1/3872 358/449 |
| 2010/0067050 | A1 | 3/2010 | Matsuura et al. |
| 2010/0295235 | A1 | 11/2010 | Kanamoto |
| 2013/0140767 | A1 | 6/2013 | Inui |
| 2013/0168915 | A1 | 7/2013 | Saito |

FOREIGN PATENT DOCUMENTS

| | | |
|---|---|---|
| CN | 101970240 A | 2/2011 |
| CN | 103129182 A | 6/2013 |
| JP | 2-182633 A | 7/1990 |
| JP | 9-109492 A | 4/1997 |
| JP | 9-188455 A | 7/1997 |
| JP | 9-281853 A | 10/1997 |
| JP | 10-93806 A | 4/1998 |
| JP | 11-275304 A | 10/1999 |
| JP | 2001-228778 A | 8/2001 |
| JP | 2006-174064 A | 6/2006 |
| JP | 2007-017704 A | 1/2007 |
| JP | 2007-69390 A | 3/2007 |
| JP | 2007-172343 A | 7/2007 |
| JP | 2009-7081 A | 1/2009 |
| JP | 2009-58738 A | 3/2009 |
| JP | 2010-74251 A | 4/2010 |
| JP | 2010-74311 A | 4/2010 |
| JP | 2010-212872 A | 9/2010 |
| JP | 2011-101973 A | 5/2011 |

* cited by examiner

F I G. 8B

(*) PAPER REGISTRATION: SELECTING PAPER SIZE

| THIN PAPER 1 (64~79g/m2) | PLAIN PAPER (80~105g/m2) | THICK PAPER 1 (106~128g/m2) | THICK PAPER 2 (129~150g/m2) |
|---|---|---|---|
| THICK PAPER 3 (151~180g/m2) | THICK PAPER 4 (181~209g/m2) | THICK PAPER 5 (210~256g/m2) | THICK PAPER 6 (257~300g/m2) |
| ONE-SIDE COATED PAPER 1 (80~105g/m2) | ONE-SIDE COATED PAPER 2 (106~128g/m2) | ONE-SIDE COATED PAPER 3 (129~150g/m2) | ONE-SIDE COATED PAPER 4 (151~180g/m2) |
| ONE-SIDE COATED PAPER 5 (181~209g/m2) | ONE-SIDE COATED PAPER 6 (210~256g/m2) | DOUBLE-SIDE COATED PAPER 1 (80~105g/m2) | DOUBLE-SIDE COATED PAPER 2 (106~128g/m2) |
| DOUBLE-SIDE COATED PAPER 3 (129~150g/m2) | DOUBLE-SIDE COATED PAPER 4 (151~180g/m2) | DOUBLE-SIDE COATED PAPER 5 (181~209g/m2) | DOUBLE-SIDE COATED PAPER 6 (210~256g/m2) |

624

CANCEL 625

OK 626

SYSTEM MONITOR/STOP

FIG. 13

| ATTRIBUTE ID | TYPE ID | VALUE | MEANING |
|---|---|---|---|
| 10 | 1 | ARBITRARY CHARACTER STRING | JOB NAME |
| 11 | 1 | ARBITRARY CHARACTER STRING | APPLICATION NAME |
| 100 | 2 | 1, 2, 3, 4, 5 or AUTO | PAPER SOURCE |
| 101 | 2 | 1, 2, 3, 4 | DISCHARGE TRAY |
| 104 | 2 | 3 | COPY COUNT |
| ... | ... | ... | ... |
| 401 | 11 | 0~7015, 0~9920 | IMAGE SIZE |
| 402 | 11 | 0~7015, 0~9920 | MOVING AMOUNT |
| 403 | 2 | A4, A3, B5, B4, POSTCARD, END-OPENING ENVELOPE(LONG FORMAT) 3 | PAPER SIZE |
| 404 | 2 | PLAIN PAPER, THICK PAPER, COATED PAPER, ENVELOPE | PAPER TYPE |
| 405 | 2 | 1, 2, 3 | DOUBLE-SIDED |
| 406 | 2 | 1, 2, 3, 4 | BINDING POSITION |

PRINTING APPARATUS, CONTROL METHOD THEREOF, AND STORAGE MEDIUM STORING A PROGRAM THAT SET A SIZE AND AN ORIENTATION OF AN ENVELOPE BASED ON A USER INSTRUCTION

This application is a continuation of U.S. application Ser. No. 14/636,023, filed Mar. 2, 2015 (pending), which is a continuation of U.S. application Ser. No. 13/674,876, filed Nov. 12, 2012, now U.S. Pat. No. 8,988,724, issued Mar. 24, 2015, the contents of each of which are incorporated herein by reference.

BACKGROUND OF THE INVENTION

Field of the Invention

The present invention relates to a printing apparatus capable of printing an image on an envelope, a control method thereof, and a storage medium storing a program.

Description of the Related Art

A printing apparatus generally includes one or more paper storage units. The printing apparatus feeds sheets stored in the paper storage unit one by one, and forms an image on the sheets. The size of paper stored in each paper storage unit can be set. For example, standard sizes such as A4 and B4, and an arbitrary size such as 210 mm×290 mm can be set. As a special standard size, an envelope size can also be set. Paper with a projection, such as the margin (to be referred to as a flap hereinafter) of an envelope or the index portion of index paper, is set so that the projection serves as the trailing end in the sub-scanning direction. With this setting, a paper area up to the projection (paper area excluding the projection) is handled as a standard size and printed. Also, there is known a technique of setting an envelope so that its flap serves as the leading end in the conveyance direction, recognizing a flap position by a sensor when the envelope is conveyed, and suppressing image misregistration (see Japanese Patent Laid-Open No. 9-109492).

In general, an envelope is longer in the sub-scanning direction than in the main scanning direction. The printing time becomes long in a conventional method of setting the sub-scanning direction (long edge) of an envelope parallel to the conveyance direction, and conveying the envelope (this will be called short-edge feed).

The time taken to print can be shortened by setting an envelope so that its flap comes to the main scanning side, and conveying the envelope (this will be called long-edge feed). However, the width of the flap differs between envelope manufacturers. For this reason, when printing on an envelope, the user needs to measure its lengths in the main scanning direction and sub-scanning direction, and create original image data so that an image is normally printed on a portion except for the flap of the envelope. This complicates the user operation.

SUMMARY OF THE INVENTION

An aspect of the present invention is to eliminate the above-mentioned problems with the conventional technology.

The present invention provides a technique of easily printing an image at a correct position on an envelope while shortening the printing time by conveying the envelope by long-edge feed.

The present invention in its first aspect provides a printing apparatus comprising: an input unit configured to input an image; a setting unit configured to set an offset amount to be used to print the image on an envelope; a conveyance unit configured to convey the envelope to set a long edge of the envelope as a leading end in a conveyance direction; and a control unit configured to, in a case where the conveyance unit conveys the envelope to set the long edge of the envelope as the leading end in the conveyance direction, control to shift the image by the offset amount set by the setting unit and print the image on the envelope.

The present invention in its second aspect provides a method of controlling a printing apparatus capable of printing an image, comprising: an input step of inputting an image; a setting step of setting an offset amount to be used to print the image on an envelope; a conveyance step of conveying the envelope to set a long edge of the envelope as a leading end in a conveyance direction; and a printing control step of, in a case where the envelope is conveyed in the conveyance step to set the long edge of the envelope as the leading end in the conveyance direction, controlling to shift the image by the offset amount set in the setting step and print the image on the envelope.

The present invention in its third aspect provides a non-transitory computer-readable storage medium storing a program for causing a computer to execute an input step of inputting an image, a setting step of setting an offset amount to be used to print the image on an envelope, a conveyance step of conveying the envelope to set a long edge of the envelope as a leading end in a conveyance direction, and a printing control step of, in a case where the envelope is conveyed in the conveyance step to set the long edge of the envelope as the leading end in the conveyance direction, controlling to shift the image by the offset amount set in the setting step and print the image on the envelope.

According to the present invention, an image can be easily printed at a correct position on an envelope while shortening the printing time by conveying the envelope by long-edge feed.

Further features of the present invention will become apparent from the following description of exemplary embodiments with reference to the attached drawings.

BRIEF DESCRIPTION OF THE DRAWINGS

FIGS. 8A and 8B are views each exemplifying a UI screen displayed on the display unit of the operation unit of the MFP according to the embodiment;

FIG. 13 is a table exemplifying the data attribute of a job according to the embodiment;

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
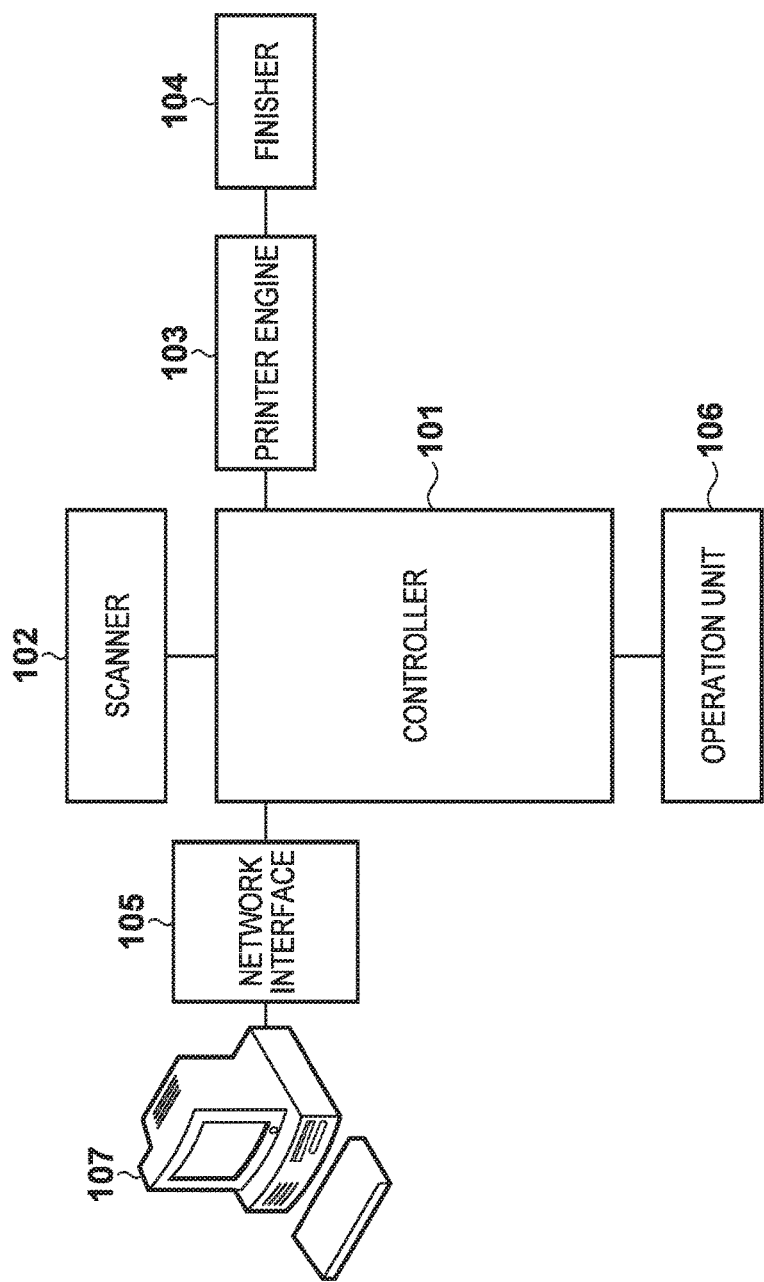
FIG. 1 is a view showing the arrangement of a multi-function peripheral (MFP) serving as an example of an image forming apparatus according to an embodiment.

FIG. 1 is a view showing the arrangement of a multi-function peripheral (MFP) serving as an example of a printing apparatus according to an embodiment of the present invention. Although the embodiment will be explained using the MFP having a plurality of functions as an example of the printing apparatus, the printing apparatus may be a single-function peripheral (SFP) having a single function.

Figure 2:
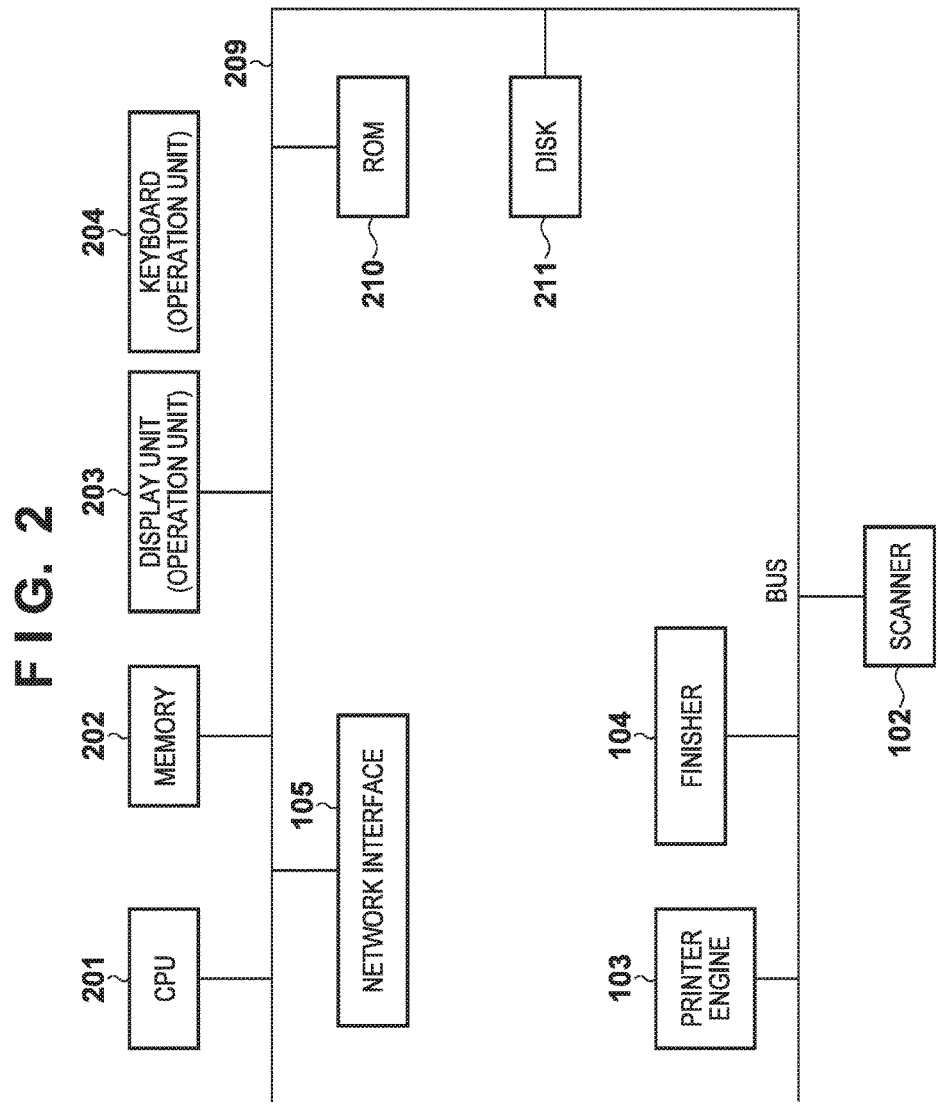
FIG. 2 is a block diagram showing the hardware arrangement of a controller according to the embodiment.

Referring to FIG. 1, a controller 101 controls the MFP, and has a hardware arrangement shown in FIG. 2. A scanner 102 is controlled by the controller 101, and scans an original to create image data of the original image. A printer engine 103 is a printer engine complying with the electrophotographic method in the embodiment. The printer engine 103 prints an image on a printing medium (sheet such as paper or envelope) under the control of the controller 101. A finisher 104 is connected to the printer engine 103, and can perform, for example, staple processing collectively for a plurality of printing media (for example, sheets) output from the printer engine 103. The controller 101 also controls the finisher 104. A network (Ethernet) interface 105 provides two-way communication with the controller 101, and can connect the MFP to a PC 107 serving as an external apparatus via a network. An operation unit 106 provides a user interface, includes a display and keyboard, displays information from the controller 101, and notifies the controller 101 of an instruction from the user.

FIG. 2 is a block diagram showing the hardware arrangement of the controller 101 according to the embodiment.

In the controller 101, a CPU 201 is connected to a memory 202, a display unit 203 and keyboard 204 of the operation unit 106, a ROM 210, and a DISK 211 via a bus 209. Various programs and data are stored in the DISK 211 (storage medium) such as a hard disk or Floppy® disk, and if necessary, sequentially read out to the memory 202 and executed by the CPU 201. The DISK 211 may be one detachable from the MFP or one incorporated in the MFP. Further, programs may be downloaded from another PC, MFP, or the like via the network and stored in the DISK 211.

The memory 202 may have both the functions of volatile and nonvolatile memories. Alternatively, the memory 202 may have the function of a volatile memory, and the DISK 211 may have the function of a nonvolatile memory. The memory 202 may be a removable memory medium.

The CPU 201 writes display data in a display memory (not shown) to present a display on the display unit 203. The CPU 201 receives data from the keyboard 204 or the display unit 203 serving as a touch panel, thereby receiving an instruction from the user. The input information is transferred to one of the memory 202, DISK 211, and CPU 201, accumulated, and used for various processes. The network interface 105 is connected to the bus 209, and the CPU 201 performs communication via the interface by loading or writing data via the network interface 105.

Further, the printer engine 103, finisher 104, and scanner 102 are connected to the bus 209. The CPU 201 reads and writes data from and in the printer engine 103, finisher 104, and scanner 102 to perform operations such as printing and scanning, and acquire various statuses. Image data can be saved in the DISK 211 or memory 202 of the controller 101 from the scanner 102 or network interface 105. Also, image data can be accumulated in advance in a removable memory and loaded by attaching the memory to the controller 101. Image data accumulated in the DISK 211 can be moved or copied to the memory 202. Various additional images (for example, a page number) can be composited to image data in the memory 202 in accordance with contents designated from the operation unit 106. Note that the printer engine 103, finisher 104, and scanner 102 may exist not in the MFP but as single peripheral devices on the network, and may be controlled by the controller 101 of the MFP.

Figure 3:
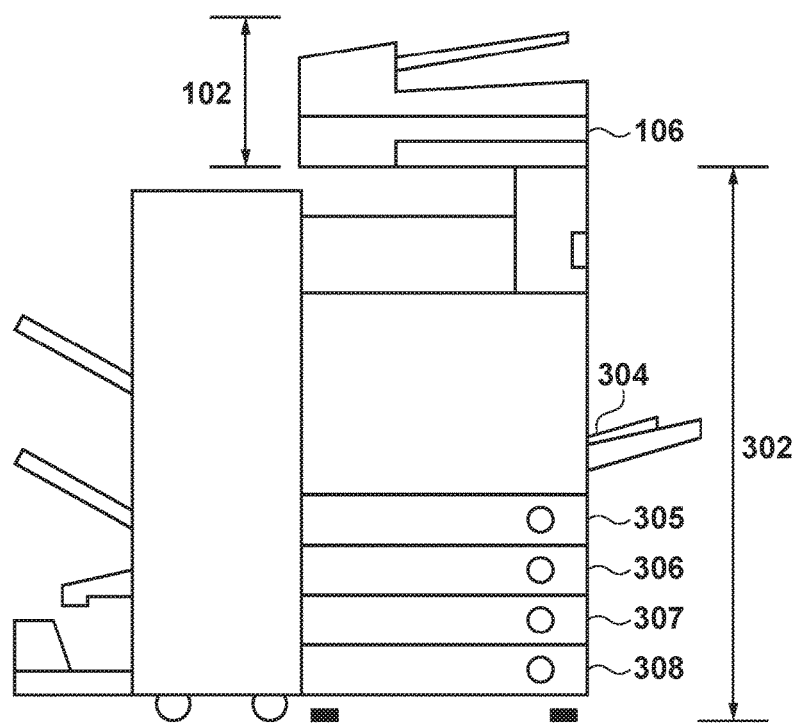
FIG. 3 is a schematic view showing the MFP according to the embodiment.

FIG. 3 is a schematic view showing the MFP according to the embodiment.

The scanner 102 serving as an image input device illuminates an image on a sheet serving as an original, and scans a CCD line sensor to convert the original image into electrical image data. The color and size of the original are determined from the electrically converted image data. A printer unit 302 serving as an image output device is a unit which converts image data into an image on a sheet. After printing on sheets, the printer unit 302 performs processes such as stapling and bookbinding, and outputs the sheets. The print operation starts and stops in accordance with instructions from the CPU 201 of the controller 101. Reference numerals 304 to 308 denote paper sources. The paper source 304 is a manual feed tray, and the paper sources 305 to 308 are paper cassettes (paper storage units), in each of which a plurality of sheets can be set. Note that the MFP can print an image on an envelope stored in the paper cassette based on print data.

Figure 4:
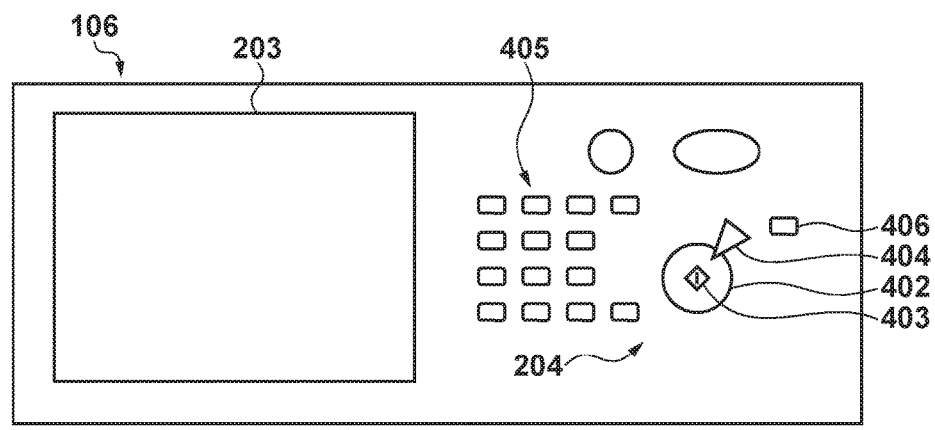
FIG. 4 is a plan view showing the operation unit of the MFP according to the embodiment.

FIG. 4 is a plan view showing the operation unit 106 of the MFP according to the embodiment.

The display unit 203 is formed from a touch panel sheet adhering to a liquid crystal display, and displays an operation screen and soft keys. When the user presses a displayed key, the display unit 203 notifies the CPU 201 of the position information.

Next, the keyboard 204 will be explained. A start key 402 is used to designate the start of an original image reading operation. An LED 403 in two, green and red colors is arranged at the center of the start key 402, and the color represents whether the start key 402 is available. A stop key 404 is used to stop an operation in progress. A ten-key pad 405 is formed from numeric and character buttons, and used to set a copy count and designate screen switching of the display unit 203 and the like. A user mode key 406 is pressed to make settings of the MFP.

Figure 5A:
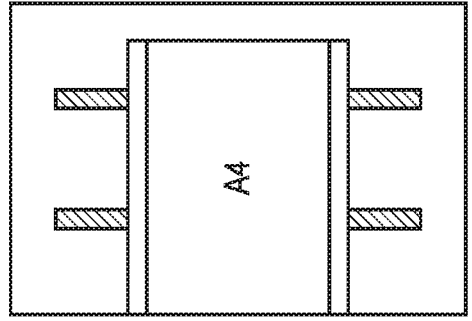
FIGS. 5A to 5C are views showing a manual feed tray when viewed from above.
Figure 5B:
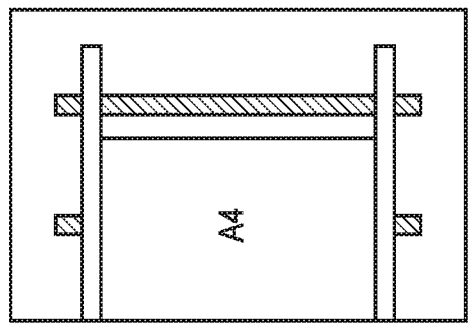
Figure 5C:
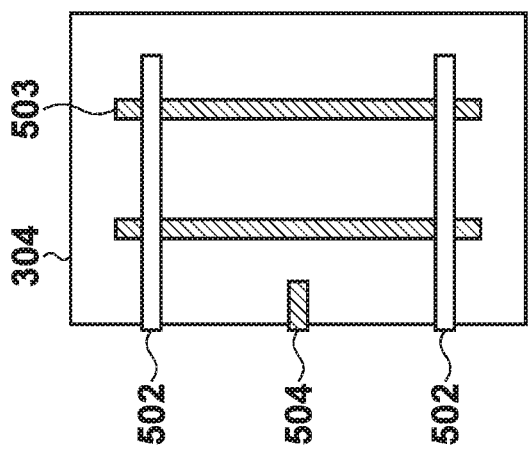

FIGS. 5A to 5C are views showing the manual feed tray 304 when viewed from above.

In FIG. 5A, the manual feed tray 304 includes guides 502 which are freely movable on rails 503. The positions of the guides 502 can be adjusted in accordance with the size of paper to be set. FIG. 5B shows guide positions when A4-size paper is set in the portrait direction. This represents a conveyance direction in long-edge feed described above. FIG. 5C shows guide positions when A4-size paper is set in the landscape direction. This represents a conveyance direction in short-edge feed described above. A sensor 504 detects that paper is placed on the manual feed tray 304. When paper is placed on the sensor 504, the controller 101 can detect that paper is set on the manual feed tray 304.

FIGS. 6A to 8B are views each exemplifying a UI screen displayed on the display unit 203 of the operation unit 106 of the MFP according to the embodiment. A method of setting a size for a paper cassette and setting a paper type from a user mode screen in FIG. 6A will be explained with reference to FIGS. 6A to 8B.

Figure 6A:
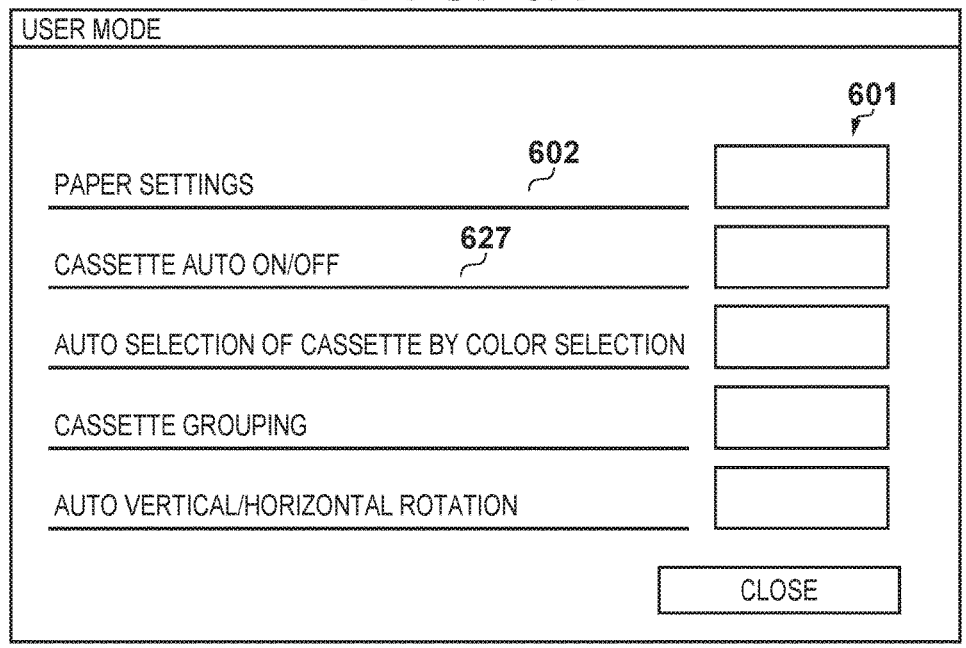
FIGS. 6A and 6B are views each exemplifying a UI screen displayed on the display unit of the operation unit of the MFP according to the embodiment.

When the user presses the user mode key 406 of the operation unit 106, a user mode screen in FIG. 6A appears. The user can set a paper size from this screen. When the user presses a button 602 corresponding to paper settings in a button group 601, a screen shown in FIG. 6B for setting the size and type of paper to be set in the paper cassette appears.

Figure 6B:
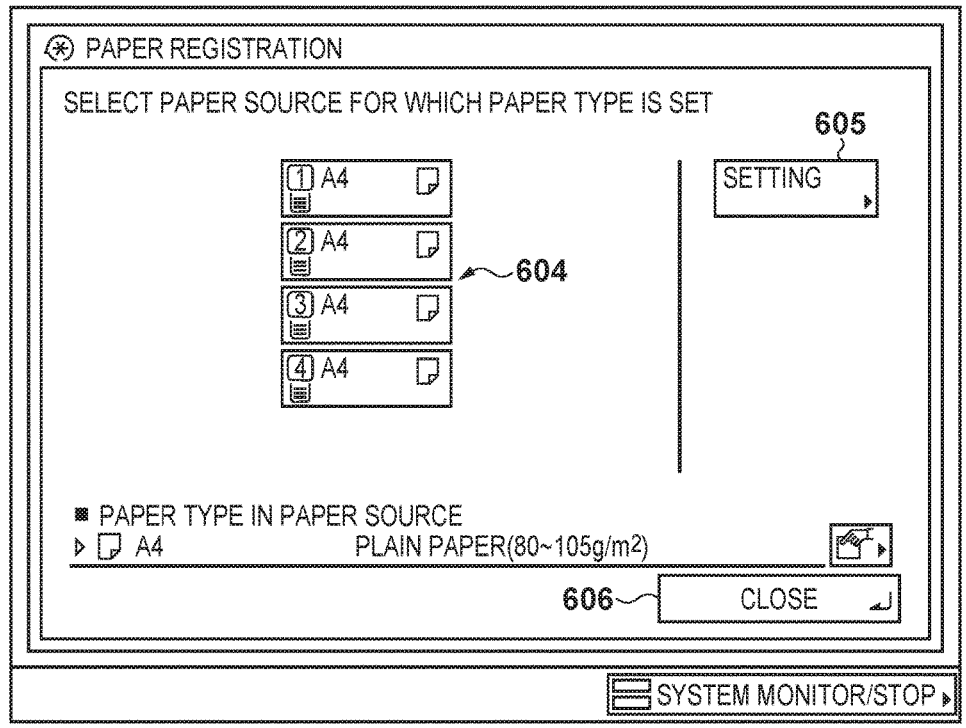

The screen in FIG. 6B provides a cassette selection button group 604. By pressing a button in the cassette selection button group 604, the user can select an arbitrary paper cassette. When the user selects a paper cassette from the button group 604 and presses a set button 605, a screen shown in FIG. 7A appears.

Figure 7A:
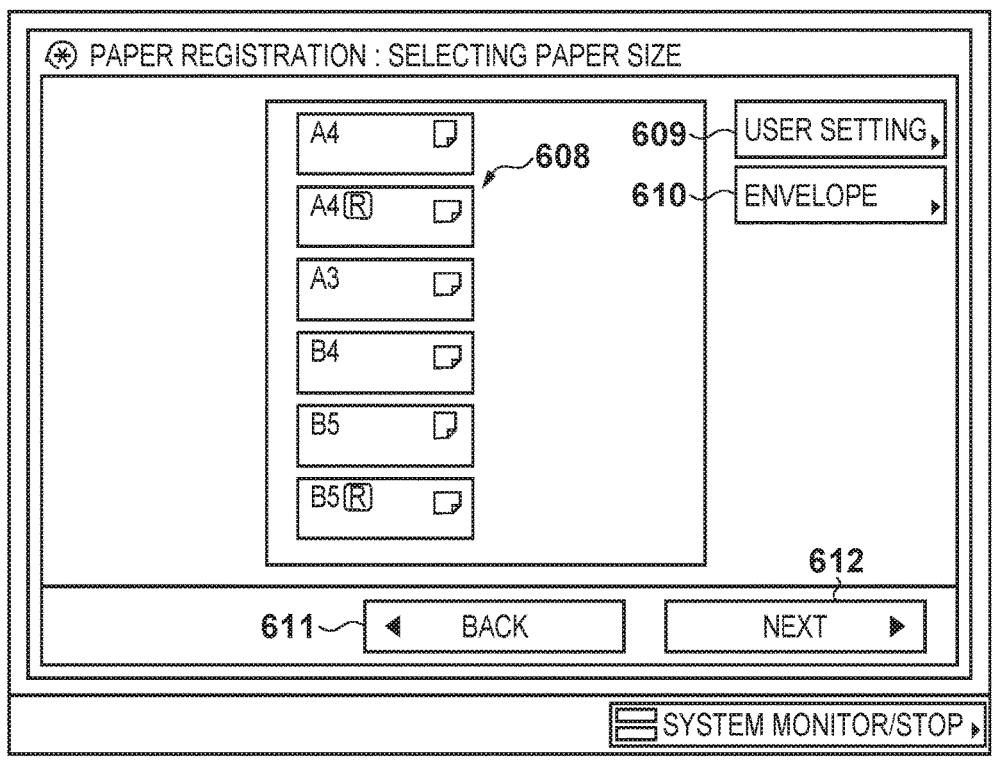
FIGS. 7A and 7B are views each exemplifying a UI screen displayed on the display unit of the operation unit of the MFP according to the embodiment.

The screen in FIG. 7A provides a standard size setting button group 608. By pressing a button in the button group 608, the user can set an arbitrary standard size for the paper cassette selected in FIG. 6B. The user presses a user setting button 609 to set paper of an arbitrary size. When the user presses the user setting button 609, a screen shown in FIG. 7B appears.

Figure 7B:
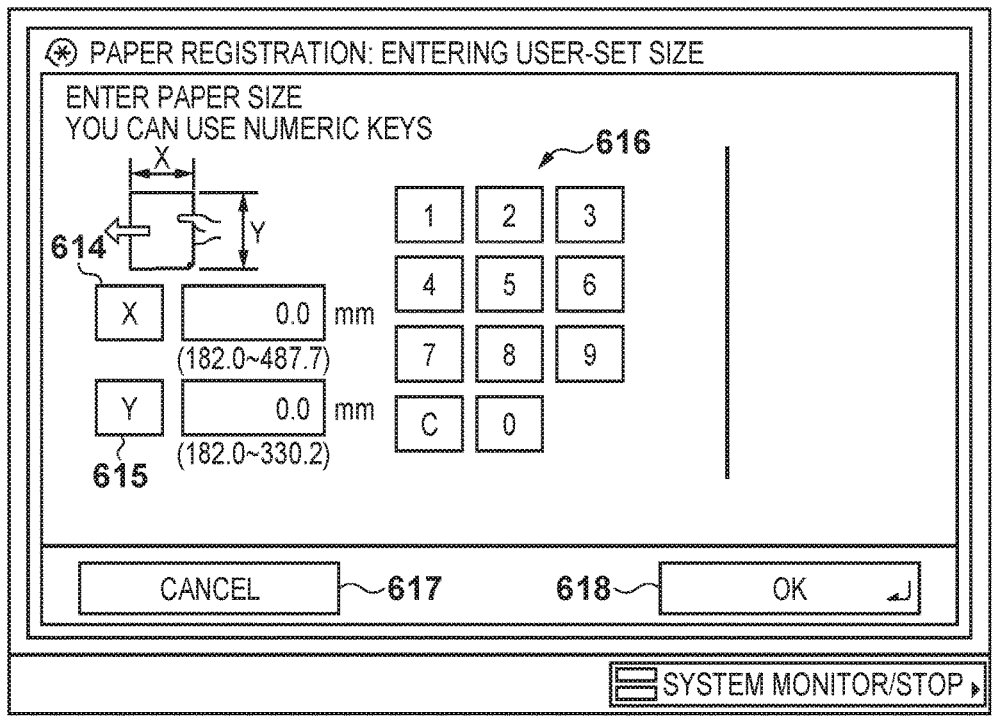

The user presses an X button 614 in FIG. 7B to set a length in the lateral direction. With a numeric button group 616, the user sets the length. The user presses a Y button 615 to set a length in the longitudinal direction. With a numeric button group 616, the user sets the length. The user presses a cancel button 617 to cancel settings on the screen. When the user presses the cancel button 617, the screen in FIG. 7B returns to the screen shown in FIG. 7A without any setting.

The user presses an OK button 618 to end input of lengths in the longitudinal and lateral directions, and set these values. When the user presses the OK button 618, the screen in FIG. 7B returns to the screen shown in FIG. 7A.

Figure 8A:
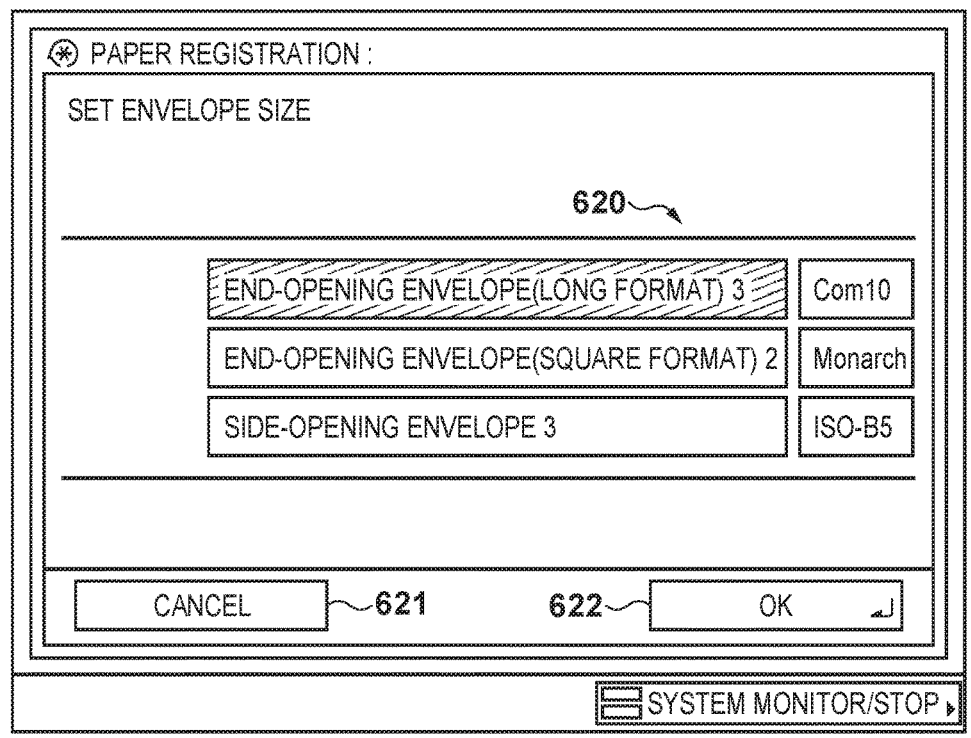

The user presses an envelope button 610 in FIG. 7A to set an envelope size. When the user presses the envelope button 610, a screen in FIG. 8A appears. The screen in FIG. 8A provides an envelope size setting button group 620. By pressing a button in the button group 620, the user can set the standard size of an envelope. The standard size of an envelope means a frequently used envelope size among various types of envelopes. The standard sizes of envelopes include, for example, "End-opening envelope (long format) 3", "End-opening envelope (square format) 2", "Side-opening envelope 3", "Com10", "Monarch", and "ISO-B5" exemplified in FIG. 8A. In the button group 620, "End-opening envelope (long format) 3" is selected as a default. The default changes depending on the destination (destination is information indicating a country or region where a device is installed, and is saved in either the memory 202 or DISK 211 of the controller 101). The default is "End-opening envelope (long format) 3" for Japan and "Com10" for overseas. The user presses a cancel button 621 to cancel settings on the screen. When the user presses the cancel button 621, the screen in FIG. 8A returns to the screen shown in FIG. 7A without any setting. The user presses an OK button 622 to decide an envelope size. When the user presses the OK button 622, an envelope size is set, and the screen in FIG. 8A returns to the screen shown in FIG. 7A.

When the user sets a standard size or user-set size as the envelope size and then presses a Next button 612 in FIG. 7A, a screen in FIG. 8B appears. This screen provides a paper type setting button group 624. By pressing a button in the button group 624, the user can set a paper type. The user presses a cancel button 625 to cancel settings on the screen. When the user presses the cancel button 625, the screen in FIG. 8B returns to the screen shown in FIG. 7A without any setting. The user presses an OK button 626 to decide a paper type. When the user presses the OK button 626, a paper type is set, and the screen in FIG. 8B returns to the screen shown in FIG. 6A. Further, when the user wants to set another paper source, he selects a paper cassette again from the cassette selection button group 604, and repeats setting processing. If no more setting is made, the user presses a close button 606, and then the screen returns to the screen shown in FIG. 6A.

Table 1 below exemplifies information set for each paper cassette according to the embodiment. After the end of paper setting processing, data for one of cassette 1 to cassette 4 in Table 1 is updated. The data can be saved in either the memory 202 or DISK 211 of the controller 101.

TABLE 1

| Cassette Source | Paper Size | X Size | Y Size | Paper Type |
| --- | --- | --- | --- | --- |
| Cassette 1 | A4 | — | — | Plain paper |
| Cassette 2 | End-opening envelope (long format) 3 | — | — | Thick paper |
| Cassette 3 | User setting | 200 mm | 297 mm | Plain paper |
| Cassette 4 | B4 | — | — | Plain paper |
| Manual Feed | Unset | — | — | Unset |

Next, a method of setting the size and type of paper when paper is set on the manual feed tray 304 will be explained. When the user sets paper on the manual feed tray 304 and sets a state as shown in FIG. 5B or 5C, the sensor 504 reacts and the printer engine 103 notifies the controller 101 that paper has been set. Upon receiving this notification, the controller 101 displays the screen shown in FIG. 7A on the display unit 203 of the operation unit 106. In this case, a Back button 611 is hidden. As described above, when the user sets a standard size or user-set size as the envelope size on this screen and then presses the Next button 612, the screen in FIG. 8B appears. As described above, this screen provides the paper type setting button group 624. The user can set a paper type by pressing a button in the paper type setting button group 624, or return from the screen in FIG. 8B to the screen shown in FIG. 7A with the cancel button 625. When the user presses the OK button 626 after the end of setting, the paper registration screen disappears, and the size and paper type in "Manual Feed" of Table 1 are updated from "unset" to an actually set size and type. When no paper remains on the manual feed tray 304, the sensor 504 reacts and the printer engine 103 notifies the controller 101 that no paper remains. Upon receiving this notification, the controller 101 updates each item in "Manual Feed" of Table 1 to "unset".

Figure 9:
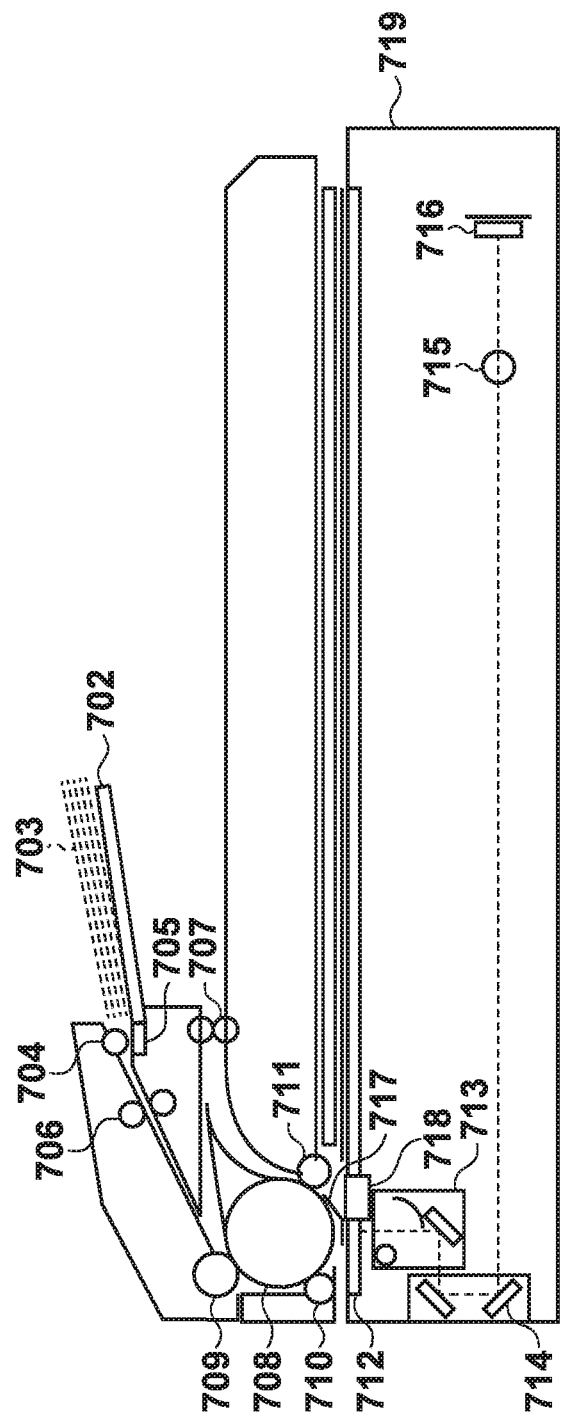
FIG. 9 is a view for explaining the structure of a scanner according to the embodiment.

FIG. 9 is a view for explaining the structure of the scanner 102.

Information on an original 703 is read while the original 703 is moved relatively to an exposure unit 713 of an original reading device 719. The original 703 is set on an original tray 702. An original feed roller 704 is paired with a separation pad 705, and conveys the originals 703 one by one. The conveyed original 703 is sent into the scanner by intermediate rollers 706, conveyed by a large roller 708 and first driven roller 709, and further conveyed by the large roller 708 and a second driven roller 710. The original 703 conveyed by the large roller 708 and second driven roller 710 passes between a sheet-fed original glass 712 and an original guide plate 717, and conveyed by the large roller 708 and a third driven roller 711 via a jump table 718. The original 703 conveyed by the large roller 708 and third driven roller 711 is discharged by a pair of original discharge rollers 707. Note that the original 703 is conveyed between the sheet-fed original glass 712 and the original guide plate 717 to contact the sheet-fed original glass 712 by the original guide plate 717.

When the original 703 passes on the sheet-fed original glass 712, the exposure unit 713 exposes a surface of the original 703 that contacts the sheet-fed original glass 712. Resultant light reflected by the original 703 travels to a mirror unit 714. The traveling reflected light is condensed through a lens 715, and converted into an electrical signal by a CCD sensor 716. The electrical signal is transferred to the controller 101.

Figure 10:
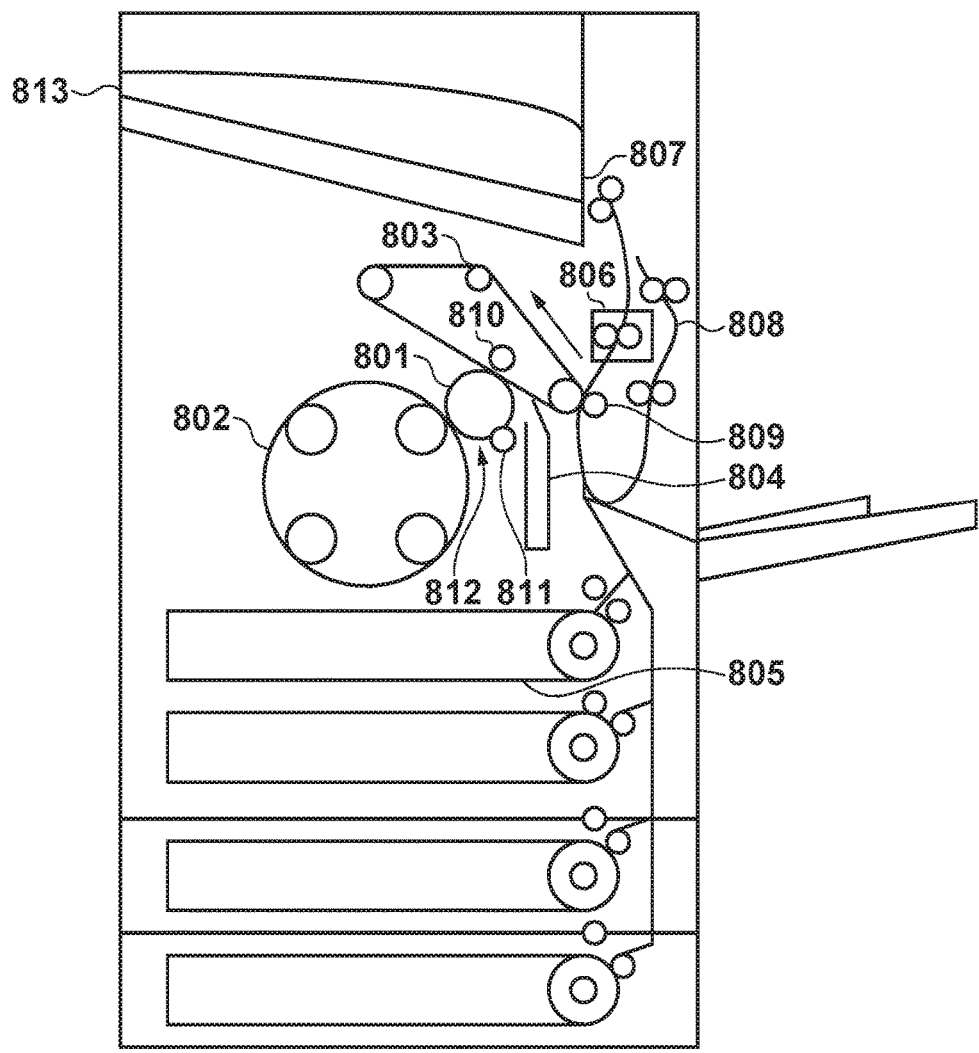
FIG. 10 is a view for explaining the arrangement of a printer unit according to the embodiment.

FIG. 10 is a view for explaining the arrangement of the printer unit 302.

FIG. 10 exemplifies a full-color printing apparatus. A primary charger 811 charges a photosensitive drum 801 to a potential of a specific polarity, and an exposure means (not shown) exposes a position indicated by an arrow 812 in accordance with an instruction from the controller 101. As a result, an electrostatic latent image corresponding to the first color component is formed. After that, the electrostatic latent image is developed using one of four developing units of a developing device 802. An intermediate transfer belt 803 is driven in a direction indicated by an arrow. When the image of the first color component formed on the photosensitive drum 801 passes through a contact portion between the photosensitive drum 801 and the intermediate transfer belt 803, it is transferred onto the intermediate transfer belt 803 by an electric field formed by a primary transfer roller 810. A cleaning device 804 cleans the surface of the photosensitive drum 801 after the transfer onto the intermediate transfer belt 803. This processing is sequentially repeated, forming a color image by superposing images of four colors onto the intermediate transfer belt 803. When an image of a single color is formed, transfer processing is performed only once. The image transferred onto the intermediate transfer belt 803 is printed onto paper fed from a paper cassette 805 by a secondary transfer roller 809. A fixing unit 806 heats and fixes the paper on which the image is printed. After the fixing, the paper passes through a portion 807, is conveyed to a discharge port 813, and discharged from the printer unit 302. When double-sided printing is performed, paper bearing an image printed on one surface is circulated through a reverse path 808, and an image is printed on its reverse surface.

Figure 11:
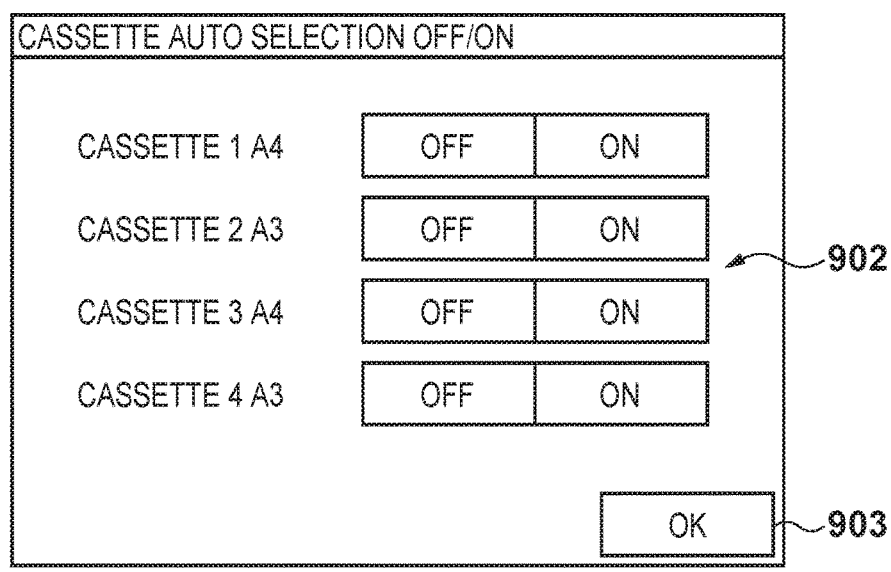
FIG. 11 is a view exemplifying a UI screen for selecting a paper cassette subjected to auto paper selection.

FIG. 11 is a view exemplifying a UI screen for selecting a paper cassette subjected to auto paper selection. Auto paper selection is processing of automatically selecting a paper source serving as the source of paper to be used in printing from a plurality of paper sources by the CPU 201 in accordance with the original size and user settings.

When the user presses the user mode key 406 of the operation unit 106, the user mode screen in FIG. 6A appears. When the user presses a button corresponding to a cassette auto ON/OFF setting 627 in the button group 601, the screen shown in FIG. 11 appears. This screen displays equipped paper cassettes and the size of paper set in each paper cassette. With a selection button group 902, the user can designate whether or not to set the paper cassette as a cassette to be selected automatically. A cassette source for which "ON" is pressed becomes a cassette subjected to auto paper selection. A cassette for which "OFF" is pressed becomes a cassette not subjected to auto paper selection. When the user presses an OK button 903, setting ends, and the screen in FIG. 11 returns to the screen shown in FIG. 6A.

Table 2 below exemplifies data representing auto paper selection of paper cassettes and manual feed according to the embodiment.

After the end of cassette auto ON/OFF setting processing, data for one of cassette 1 to cassette 4 and manual feed in Table 2 is updated in correspondence with the setting. The data can be saved in either the memory 202 or DISK 211 of the controller 101. This data is used when automatically selecting a cassette. In the example of Table 2, it is set to use all cassettes 1 to 4 in auto paper selection and not to use manual feed in auto paper selection.

TABLE 2

| Cassette | State |
| --- | --- |
| Cassette 1 | ON |
| Cassette 2 | ON |
| Cassette 3 | ON |
| Cassette 4 | ON |
| Manual Feed | OFF |

Figure 12:
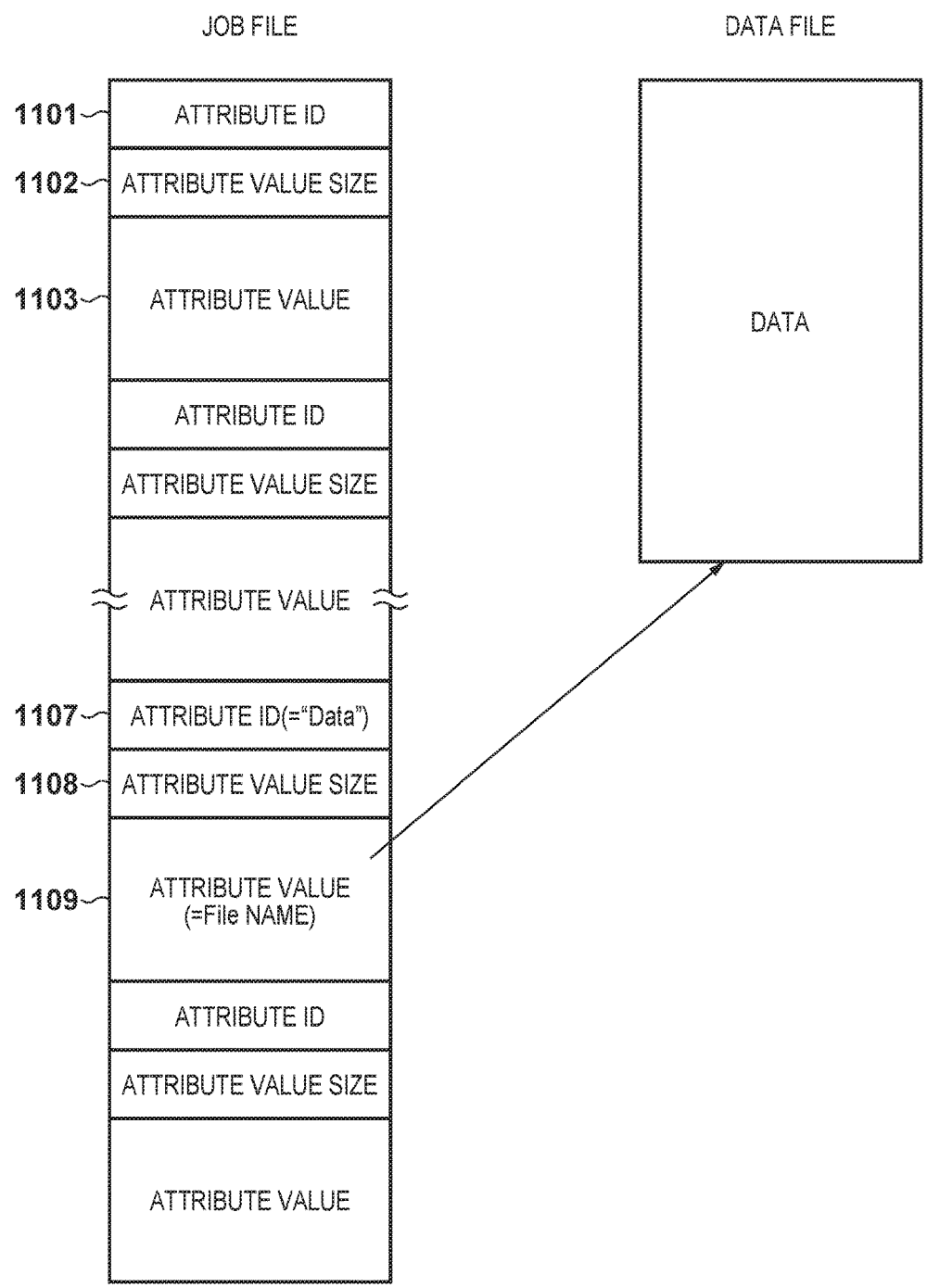
FIG. 12 is a view for explaining the data structure of a job in the embodiment.

FIG. 12 is a view for explaining the data structure of a print job in the embodiment. An application in the device generates this data upon receiving an instruction to execute a print job.

The entity of the job is represented by successively arranging a plurality of sets each of which has an attribute ID 1101, attribute value size 1102, and attribute value 1103. When a job contains data, it holds a value representing data as an attribute ID, the size of a file name as an attribute value size, and the file name of a file holding document data as an attribute value, as represented by 1107, 1108, and 1109. Each attribute value contains a data format (for example, PDL format may be used), copy count, cassette source, paper size used in printing, and designation of finishing processing.

FIG. 13 is a table exemplifying the data attribute of a print job according to the embodiment.

An attribute ID 1201 represents the ID number of an attribute. A type ID 1202 represents the type (size) of an ID such that "1" is an undefined length and "2" is 1 byte. A value 1203 represents a possible value and has a meaning as represented by a meaning 1204. The data attribute shown in FIG. 13 is merely an example, and various other attributes exist. A job is formed by setting these values in the attribute ID, attribute value size, and attribute value shown in FIG. 12.

Figure 14:
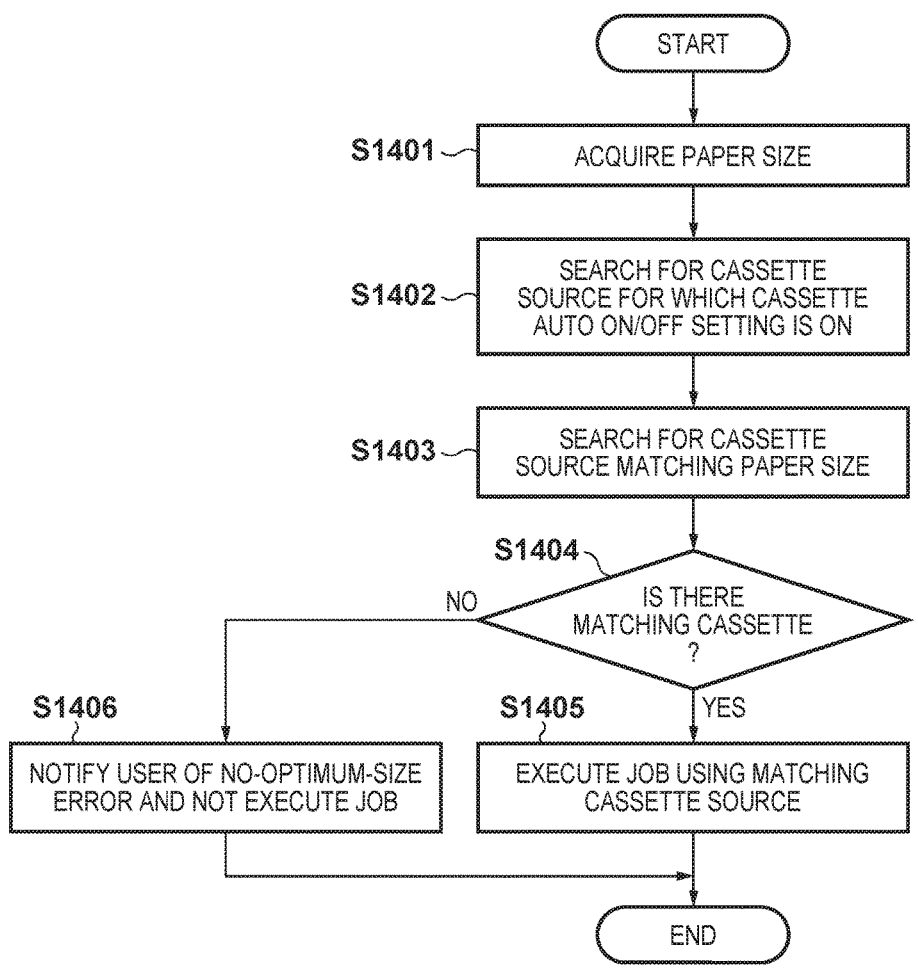
FIG. 14 is a flowchart for explaining an operation when the MFP according to the embodiment automatically selects a paper cassette for a job for which a paper size is designated.

FIG. 14 is a flowchart for explaining an operation when the MFP according to the embodiment automatically selects a paper cassette for a job for which a paper size is designated. This processing is implemented by executing a program stored in the memory 202 by the CPU 201 of the controller 101.

When auto paper selection processing starts, the CPU 201 acquires a paper size requested of processing from an attribute designated by the job in step S1401. The process advances to step S1402, and the CPU 201 searches for a paper cassette whose state is set to "ON" in Table 2, that is, a paper cassette which is used in auto paper selection. The process then advances to step S1403, and the CPU 201 determines whether a size coincident with the paper size acquired in step S1401 exists in paper sizes in Table 1 among the paper cassettes whose states are "ON".

In step S1404, the CPU 201 determines whether there is a cassette source having a coincident size. If such a cassette source exists, the process advances to step S1405, and the CPU 201 executes the job using the coincident paper cassette source. If the CPU 201 determines in step S1404 that no such cassette source exists, the process advances to step S1406, and the CPU 201 notifies the user that there is no usable size, and then interrupts the job.

When the paper size acquired in step S1401 is B4 in the states of Table 1 and Table 2, the cassette search target in Table 1 is cassette 4. Paper of the paper size B4 is set for cassette 4 in table 1, and the state of cassette 4 in Table 2 is "ON". Thus, a paper cassette corresponding to the paper size B4 is cassette 4.

Figure 15A:
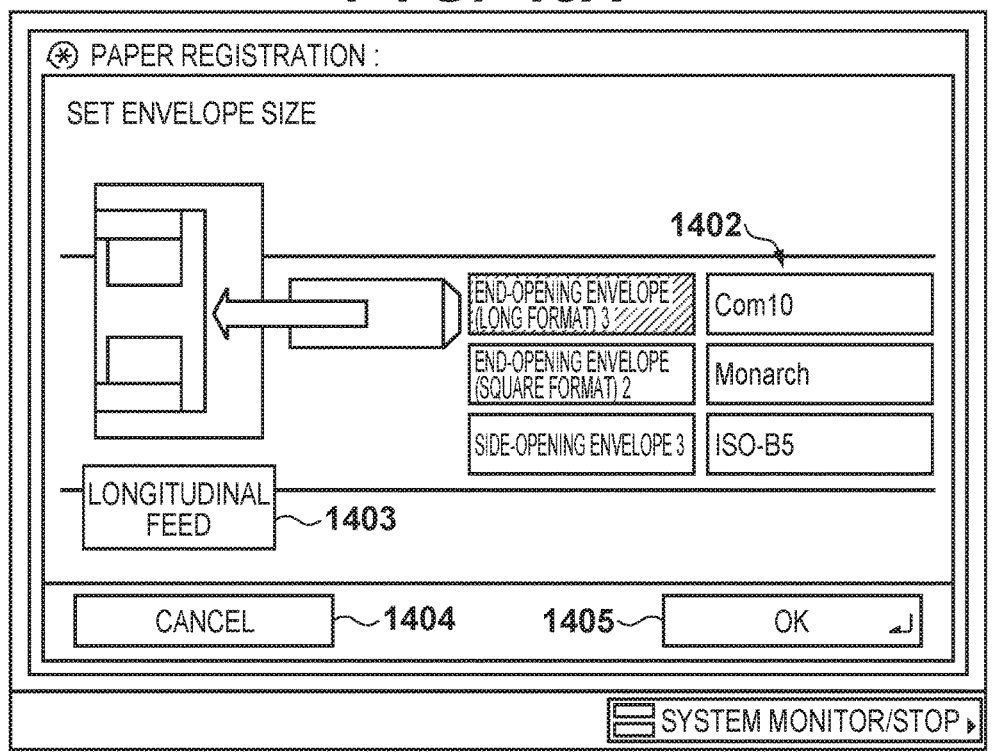
FIGS. 15A and 15B are views for explaining an envelope size setting method according to the embodiment.
Figure 15B:
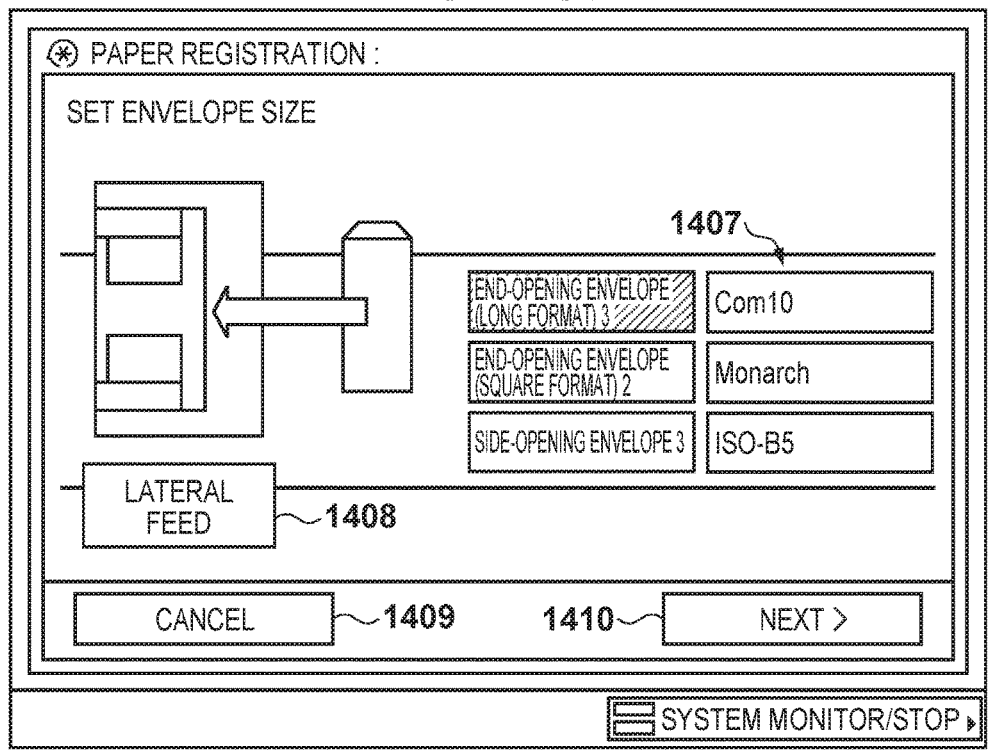
Figure 16:
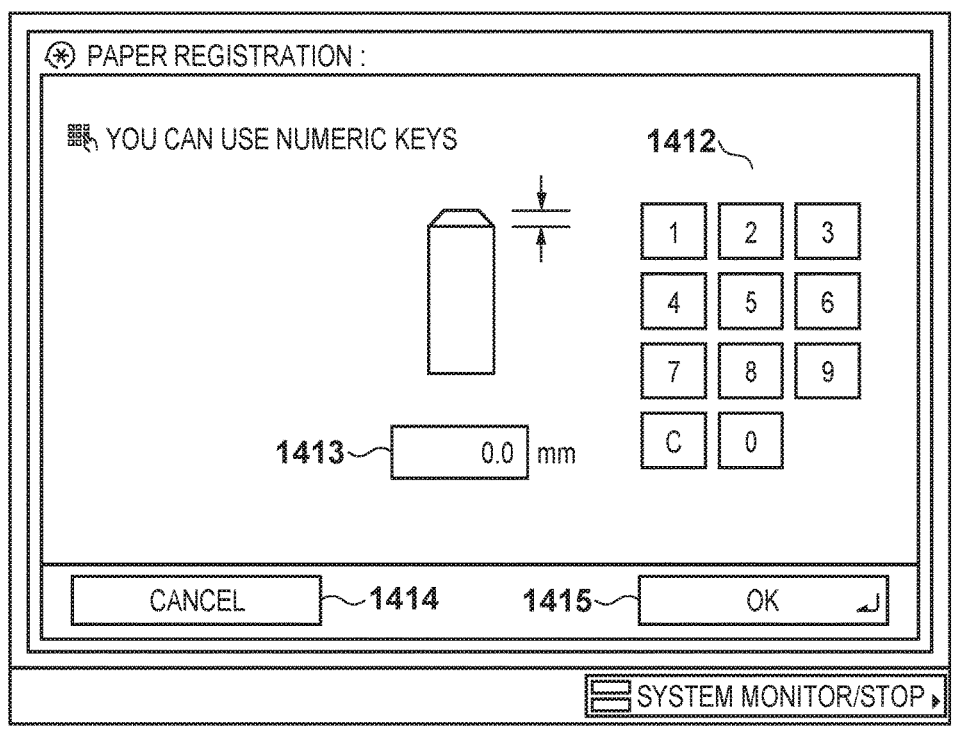
FIG. 16 is a view for explaining the envelope size setting method according to the embodiment.

FIGS. 15A, 15B, and 16 are views for explaining an envelope size setting method according to the embodiment.

When paper is set in the manual feed tray 304, the display unit 203 of the operation unit 106 displays the screen in FIG. 7A. If the user presses the envelope button 610 on this screen, a screen in FIG. 15A appears. This screen represents a case in which an envelope is conveyed parallel to its long edge (lateral feed or short-edge feed). The screen provides an envelope size setting button group 1402. By pressing a button in the button group 1402, the user can set an envelope size. In the button group 1402, "End-opening envelope (long format) 3" is selected as a default. The default changes depending on the destination. The default is "End-opening envelope (long format) 3" for Japan and "Com10" for overseas. The user presses a cancel button 1404 to cancel settings on the screen. When the user presses the cancel button 1404, the screen in FIG. 15A returns to the screen shown in FIG. 7A without any setting. The user presses an OK button 1405 to decide an envelope size. When the user presses the OK button 1405, an envelope size is set, and the screen in FIG. 15A returns to the screen shown in FIG. 7A. The CPU 201 saves the set contents in either the memory 202 or the DISK 211. The user presses a longitudinal feed button 1403 to feed an envelope longitudinally (long-edge feed). When the user presses the longitudinal feed button 1403, a screen shown in FIG. 15B appears.

The screen in FIG. 15B represents a case in which an envelope is conveyed so that its long edge serves as the leading end in the conveyance direction (longitudinal feed or long-edge feed). The screen provides an envelope size setting button group 1407. By pressing a button in the button group 1407, the user can set an envelope size. In the button group 1407, "End-opening envelope (long format) 3" is selected as a default. The default changes depending on the destination. The user presses a cancel button 1409 to cancel settings on the screen. When the user presses the cancel button 1409, the screen in FIG. 15B returns to the screen in FIG. 7A without any setting. The user presses a lateral feed button 1408 to return to the screen in FIG. 15A. The user presses a Next button 1410 to decide an envelope size and enter a flap size. When the user presses the Next button 1410, a screen in FIG. 16 serving as an offset setting screen appears. This screen provides a numeric button group 1412, and the user can enter a flap size (margin width) in mm by using the numeric button group 1412. A display field 1413 displays the entered value. The user presses a cancel button 1414 to cancel settings on the screen. When the user presses the cancel button 1414, the screen in FIG. 16 returns to one in FIG. 15B. The user presses an OK button 1415 to decide a flap size. When the user presses the OK button 1415, a flap size is set, and the screen in FIG. 16 returns to the screen in FIG. 7A. The CPU 201 saves the set contents in either the memory 202 or the DISK 211.

Table 3 below represents the data structure of the envelope size and flap size according to the embodiment. After the end of envelope setting processing, data in the flap size of Table 3 is updated. As described above, this data can be saved in either the memory 202 or the DISK 211 of the controller 101.

TABLE 3

| Envelope Size | Flap Size |
| --- | --- |
| 1: COM10 | 0.0 mm |
| 2: Monarch | 0.0 mm |
| 3: ISO-C5 | 0.0 mm |
| 4: End-opening envelope (long format) 3 | 0.0 mm |
| 5: Side-opening envelope 3 | 0.0 mm |
| 6: End-opening envelope (square format) 2 | 0.0 mm |

Figure 17A:
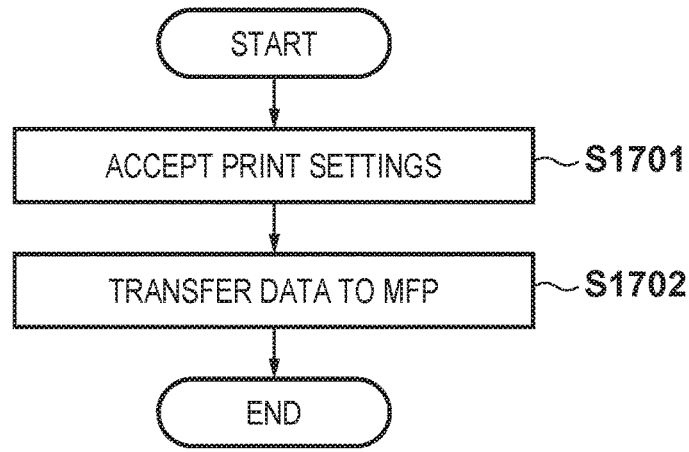
FIGS. 17A and 17B are flowcharts for explaining a printing sequence on an envelope by a PDL job according to the embodiment.
Figure 17B:
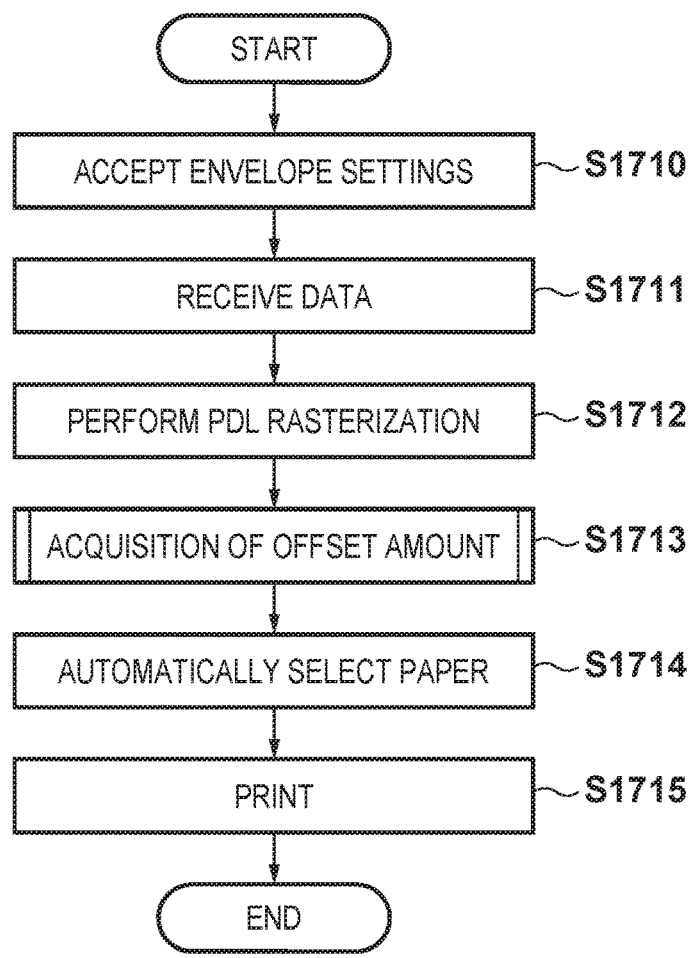

FIGS. 17A and 17B are flowcharts for explaining a sequence of printing PDL data on an envelope by a print job according to the embodiment. FIG. 17A shows processing by the PC 107, and FIG. 17B shows processing by the MFP according to the embodiment. Note that the processing shown in the flowchart of FIG. 17A is implemented by reading out a program stored in the ROM (not shown) of the PC 107 and executing it by the CPU (not shown) of the PC 107. Also, the processing shown in the flowchart of FIG. 17B is implemented by reading out a program stored in the ROM 210 and executing it by the CPU 201.

First, in step S1701 of FIG. 17A, the PC 107 accepts the print settings of a PDL image output job from the user. The print setting contents include the copy count, paper size (envelope size in printing on an envelope), single-sided/ double-sided, page output order, sort output, and stapling/ no-stapling. Then, the process advances to step S1702, and the PC 107 accepts a print instruction from the user, and converts code data to be printed into so-called PDL data (print data) by using driver software installed in the PC 107. The PC 107 transfers the PDL data to the controller 101 via the network interface 105 together with the print setting parameters set in step S1501.

Figure 20C:
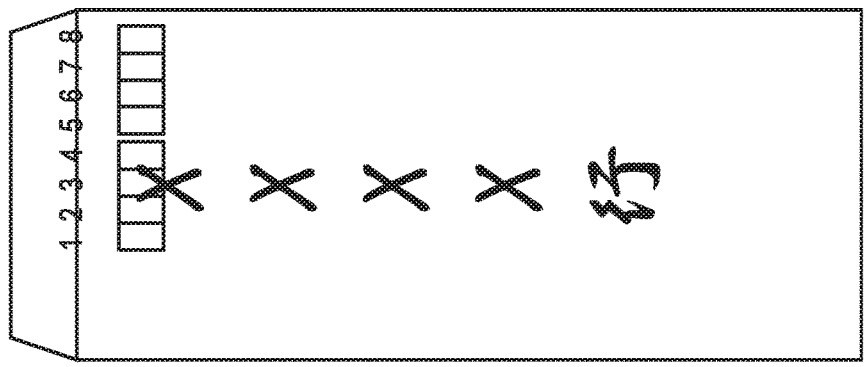
FIGS. 20A to 20C are views exemplifying an envelope size and printing on an envelope.
Figure 20B:
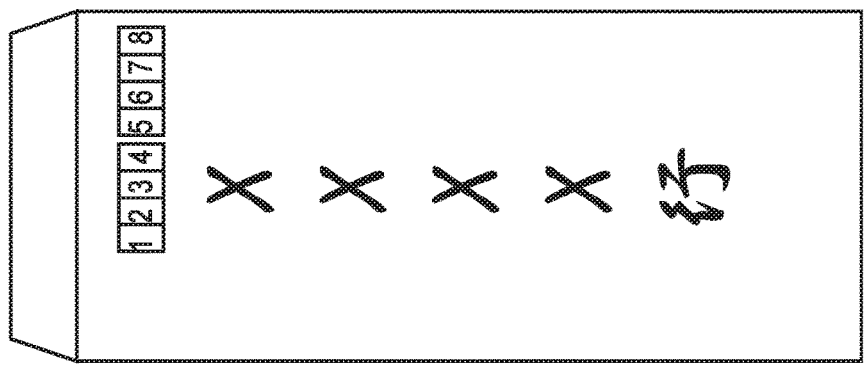
Figure 20A:
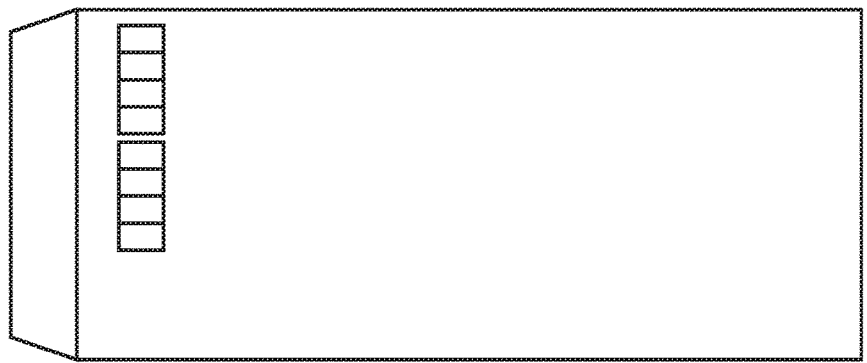

In step S1710, the CPU 201 detects that, for example, an envelope of End-opening envelope (long format) 3 in FIG. 20A is set in the manual feed tray 304. The user selects the longitudinal feed 1403 in FIG. 15A, and sets "End-opening envelope (long format) 3" as the envelope size in FIG. 15B. Further, the user enters, for example, "30.0" mm as the flap size and presses the OK button 1415 in FIG. 16. Then, the items in "Manual Feed" of Table 1 are updated as follows.

More specifically, in "Manual Feed", "End-opening envelope (long format) 3" is set as the paper size and "envelope" is set as the paper type. Also, the flap size of "End-opening envelope (long format) 3" in the envelope size of Table 3 is updated to 30.0 mm.

In step S1711, the CPU 201 receives the PDL data transferred from the PC 107 via the network interface 105. The process advances to step S1712, and the CPU 201 rasterizes the PDL data into image data based on the print setting parameters. Rasterization into image data is executed in the memory 202.

Figure 19:
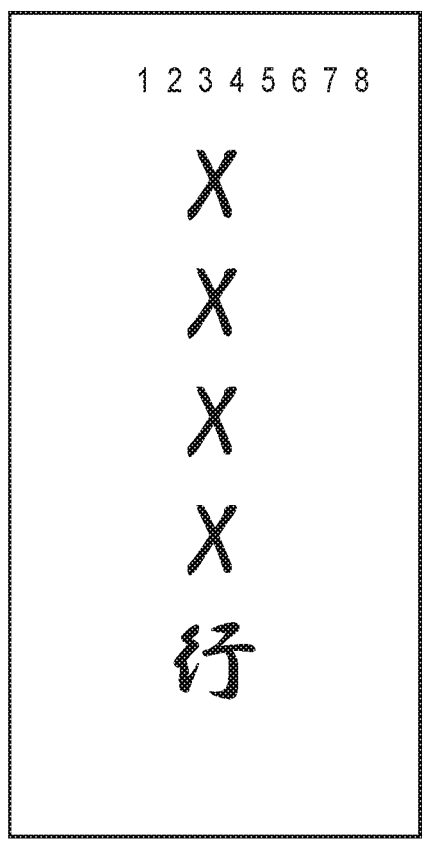
FIG. 19 is a view showing an image of image data rasterized in a memory when End-opening envelope (long format) 3 is set as the image size.

FIG. 19 is a view showing an image of image data rasterized in the memory when End-opening envelope (long format) 3 is set as the image size.

End-opening envelope (long format) 3 is defined by a size of 120 mm×235 mm. Image data of a size corresponding to this size is rasterized in the memory 202.

After that, the process advances to step S1713, and the CPU 201 acquires an offset amount based on the paper size (envelope size) designated by the PDL job. Details of this processing will be explained with reference to the flowchart of FIG. 18.

Figure 18:
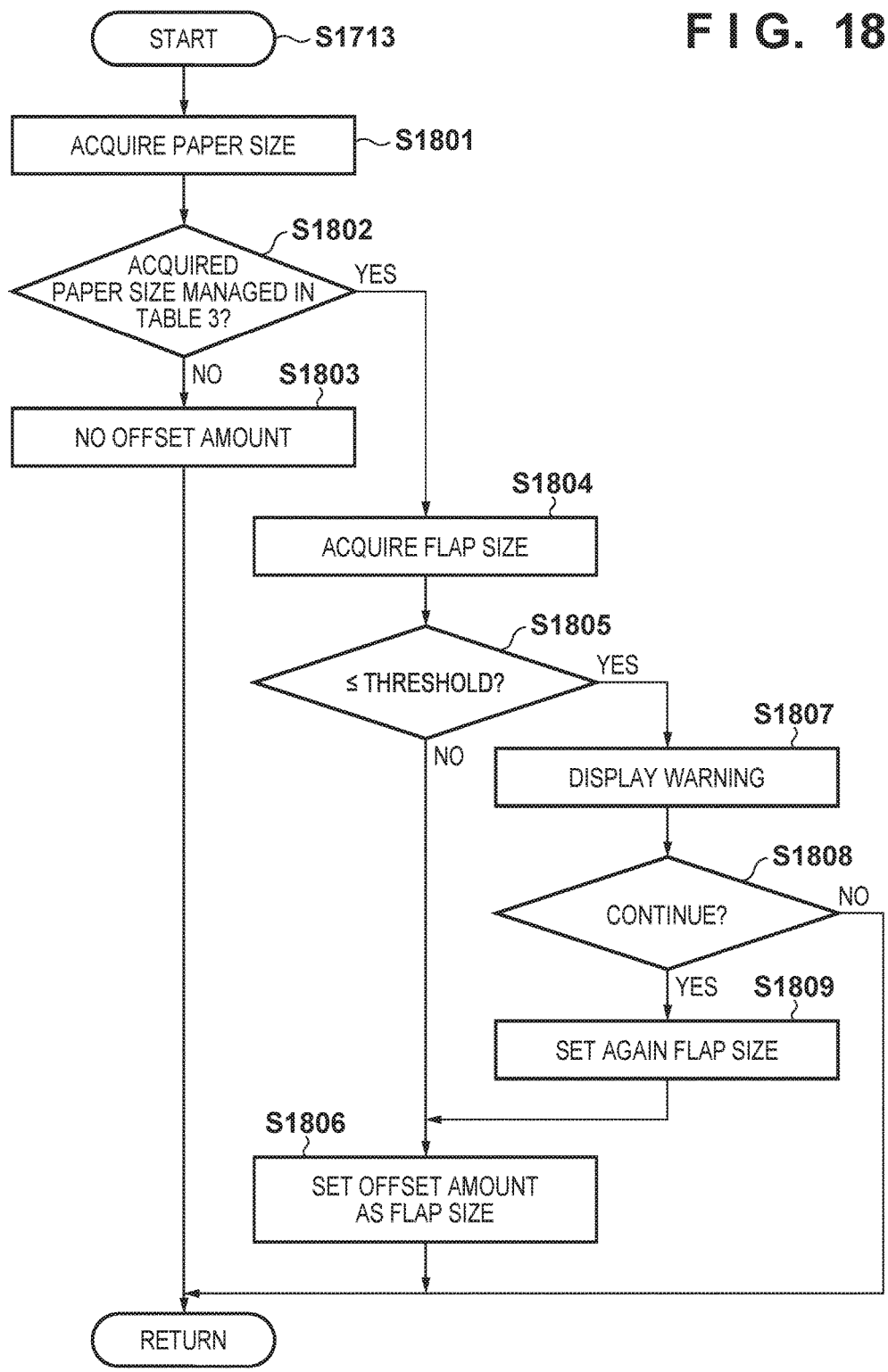
FIG. 18 is a flowchart for explaining offset amount acquisition processing in step S1713 of FIG. 17.

FIG. 18 is a flowchart for explaining the offset amount acquisition processing in step S1713 of FIG. 17. Note that the processing shown in the flowchart of FIG. 18 is implemented by reading out a program stored in the ROM 210 and executing it by the CPU 201.

First, in step S1801, the CPU 201 acquires the paper size (envelope size) of PDL data based on attribute data of the PDL data. The process then advances to step S1802, and the CPU 201 determines whether the acquired paper size is managed by the envelope size in Table 3. If the acquired paper size is not managed by the envelope size in Table 3, the process advances to step S1803, the CPU 201 determines that no offset amount (0.0 mm) is set, and the process ends. If the CPU 201 determines in step S1802 that the acquired paper size is managed by the envelope size in Table 3, the process advances to step S1804, and the CPU 201 acquires a flap size set in Table 3. The process advances to step S1805, and the CPU 201 determines whether the flap size is equal to or smaller than a threshold (for example, 1 mm). If the flap size is equal to or smaller than the threshold, the flap size is not set from the beginning (initial value of 0.0 mm) or the flap size is not proper, so the process advances to step S1807. If the CPU 201 determines in step S1805 that the flap size is larger than the threshold, the process advances to step S1806, and the CPU 201 decides, as the offset amount, a flap size corresponding to the envelope size that is set in Table 3. Then, the process ends.

Figure 23A:
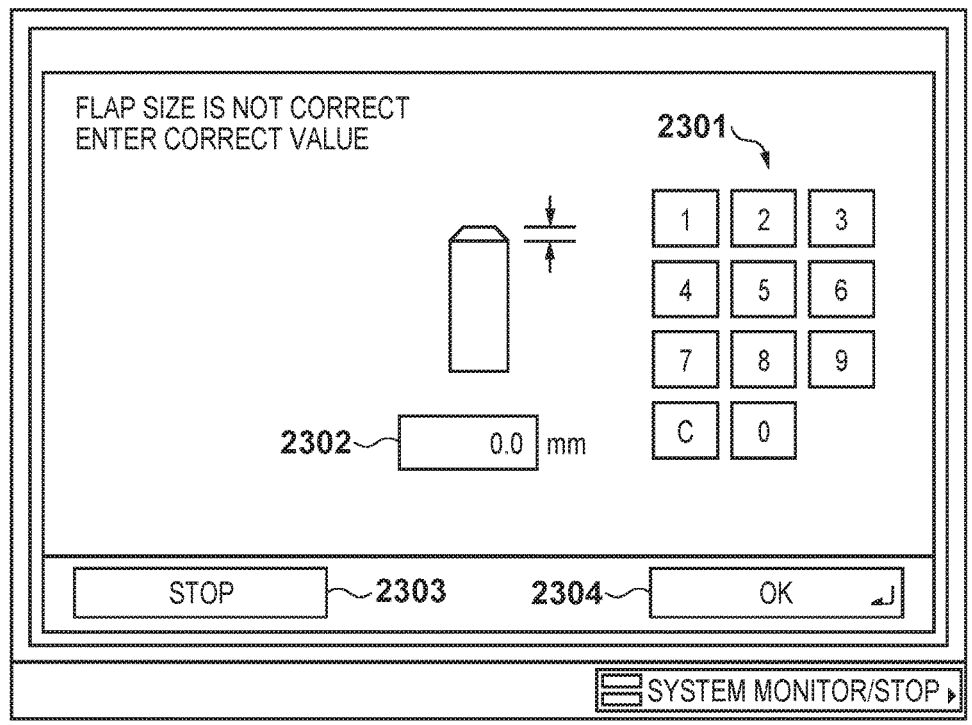
FIG. 23A is a view exemplifying a warning screen when the flap size is not correct.

If the process advances to step S1807, the CPU 201 determines that the size is not correct as the flap size, and displays a warning to the user. In this case, the CPU 201 temporarily interrupts the job, and displays a screen shown in FIG. 23A on the display unit 203 of the operation unit 106. This screen is the same as the screen in FIG. 16 for entering a flap size. A warning message "FLAP SIZE IS NOT CORRECT. ENTER CORRECT VALUE," is displayed. The user selects whether or not to continue the job by entering a proper flap size. If the job is to continue, the process advances to step S1809, and the CPU 201 acquires a flap size entered using the screen of FIG. 23A, and updates Table 3. When the user enters a flap size using a numeric key pad 2301 on the screen of FIG. 23A and presses an OK button 2304, the set value is input as the flap size, and the CPU 201 updates a corresponding flap size in Table 3. A display field 2302 displays an entered flap size. Thereafter, the process advances to step S1806, and the CPU 201 decides the flap size set in Table 3 as the offset amount and continues the processing. In step S1809, it may be determined whether the re-set flap size is equal to or larger than the above-mentioned threshold, and, only when the re-set flap size is equal to or larger than the threshold, that is, when the re-set flap size is a proper value, the Table 3 may be updated. If the user presses a stop button 2303 in the screen of FIG. 23A, the processing of the job ends.

In this way, the offset value of an image is obtained and set based on a flap size corresponding to a paper size (envelope size) set for PDL data.

Thereafter, the process advances to step S1714, and the CPU 201 selects a paper source matching the acquired paper size. Since the designated paper size is End-opening envelope (long format) 3, a paper source in which an envelope of End-opening envelope (long format) 3 is set is selected, and a paper feed direction set for the paper source is acquired.

The process advances to step S1715, and the CPU 201 controls the printer engine 103 to perform printing control based on image data. At this time, the image data is printed by shifting the output position of the image data by the offset amount. Accordingly, a printing result as shown in FIG. 20B can be obtained. If the output position of the image data is not shifted by the offset amount, the printing result becomes one as shown in FIG. 20C in which the positions of the address and postal code are misaligned. This is because, if an image rasterized in the memory 202 is aligned with the upper end of paper and printed on an envelope, similar to printing an image on paper other than an envelope, the image is not printed at a correct position owing to the presence of the flap of the envelope.

By conveying an envelope by long-edge feed under the above-described control, a larger number of sheets can be fed per unit time than by conveying envelopes by short-edge feed, and the time taken to print can be shortened. When conveying an envelope by long-edge feed and printing, even if the user creates an original image to be printed without taking account of the length of a flap, the image is correctly printed at a portion excluding the flap.

In the above description, print processing based on PDL data received from the PC 107 has been exemplified. However, the embodiment is also applicable to copy processing. Copy processing of reading an original by the scanner 102 and printing it will be exemplified below.

Figure 21A:
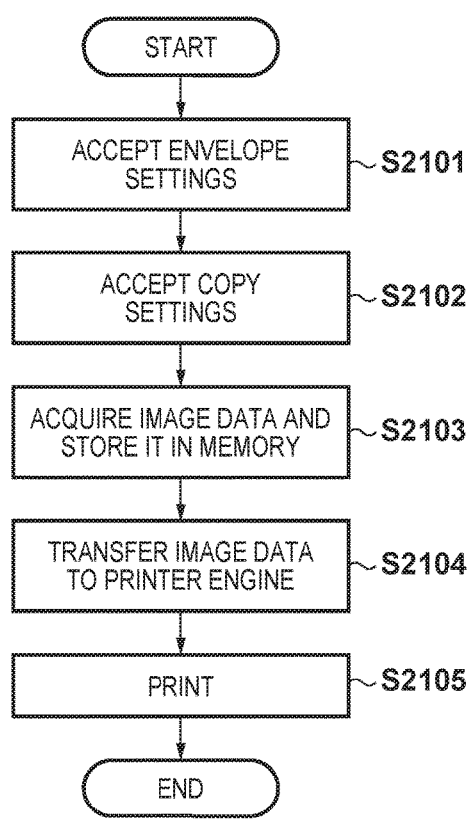
FIG. 21A is a flowchart showing a copy job processing sequence according to the embodiment.

FIG. 21A is a flowchart showing a copy job processing sequence according to the embodiment. This processing is implemented by executing a program stored in the memory 202 by the CPU 201 of the controller 101.

First, in step S2101, the CPU 201 accepts envelope settings from the user. For example, an envelope of End-opening envelope (long format) 3 shown in FIG. 20A is set in the manual feed tray 304. The flap sizes in Table 1 and Table 3 are updated in accordance with a numeric value entered by the user. This is the same as that described with reference to FIGS. 15A, 15B, and 16, and a description thereof will not be repeated.

Then, the process advances to step S2102, and the CPU 201 accepts various settings of the copy job from the user via the operation unit 106. The setting contents include the copy count, paper source, paper size, single-sided/double-sided printing, enlargement/reduction ratio, sort output, and stapling/no-stapling. Thereafter, the process advances to step S2103. If the user inputs a copy start instruction via the operation unit 106, the CPU 201 controls the scanner 102 via the bus 209 to perform an original image data reading operation. At this time, the CPU 201 acquires a paper size (envelope size) designated by the copy job, and determines whether there is an envelope size managed in Table 3 that coincides with the acquired size. If a coincident size exists, the CPU 201 acquires a flap size corresponding to the envelope size. When a normal paper size is designated, the size of an image captured from the scanner 102 is equal to this paper size. However, for an envelope size with a flap size, image data of a size obtained by adding the flap size to the envelope size is captured. The CPU 201 receives the captured image data, and stores it in the memory 202.

Figure 22A:
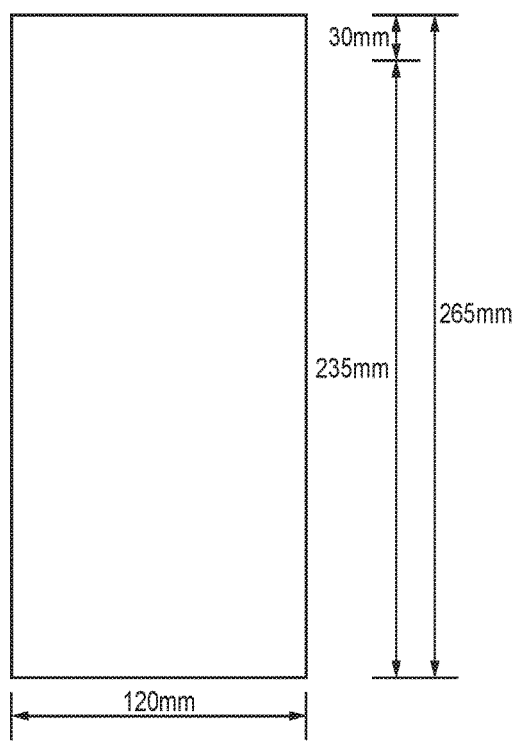
FIG. 22A is a view showing an image of image data for an envelope of End-opening envelope (long format) 3.
Figure 22B:
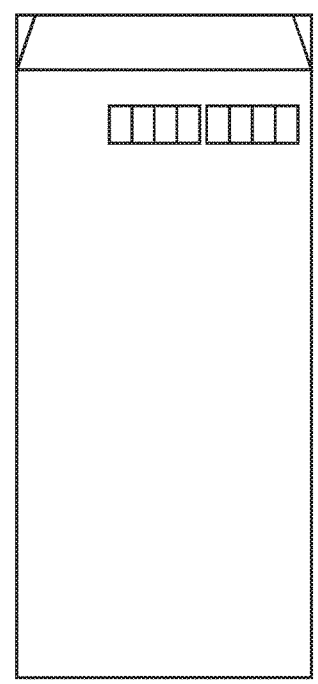
FIG. 22B is a view showing an envelope size of End-opening envelope (long format) 3.

FIG. 22A is a view showing an image of image data rasterized in the memory 202 when End-opening envelope (long format) 3 is set as the envelope size. FIG. 22B is a view showing an envelope size of End-opening envelope (long format) 3.

End-opening envelope (long format) 3 is defined by a size of 120 mm×235 mm. Assume that the flap size is set to 30 mm. In this case, therefore, image data from the scanner 102 is stored in the memory 202 at a size of 120 mm×265 mm. When no flap size is set, the flap size becomes 0 mm and thus image data having a data size of 120 mm×235 mm is stored in the memory 202.

The process then advances to step S2104, and the CPU 201 transfers the image data in the memory 202 to the printer engine 103 at an appropriate timing while controlling the printer engine 103 via the bus 209. The process advances to step S2105, and the controller 101 controls the printer unit 302 to convey a sheet (envelope) from a paper source designated by the copy setting, and print the image data.

Accordingly, a printing result as shown in FIG. 20B is obtained. When an envelope of the End-opening envelope (long format) 3 size is set on the original table with its flap opened (long-edge feed), image data of a size including the flap size can be copied onto the envelope.

Figure 21B:
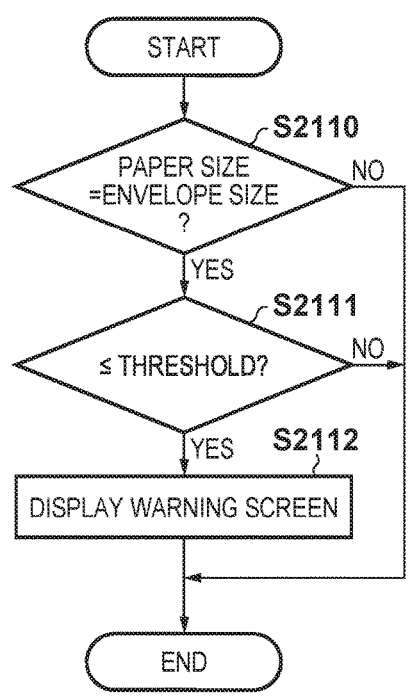
FIG. 21B is a flowchart for explaining processing of warning the user about a flap size input error.

When a copy start instruction is accepted in step S2102 after accepting envelope settings in step S2101, processing shown in FIG. 21B may be performed to warn the user about a flap size input error. Note that the processing shown in the flowchart of FIG. 21B is implemented by executing a program stored in the memory 202 by the CPU 201 of the controller 101.

In step S2110, the CPU 201 determines whether the envelope size is selected as the paper size. If the envelope size is selected, the process advances to step S2111. In step S2111, the CPU 201 determines whether a flap size corresponding to the envelope size is equal to or smaller than a threshold (for example, 0 mm) in Table 3. If the flap size is equal to or smaller than the threshold, the CPU 201 determines that the flap size is not correct. Thus, the process advances to step S2112, and the CPU 201 displays a screen shown in FIG. 23B and warns the user.

Figure 23B:
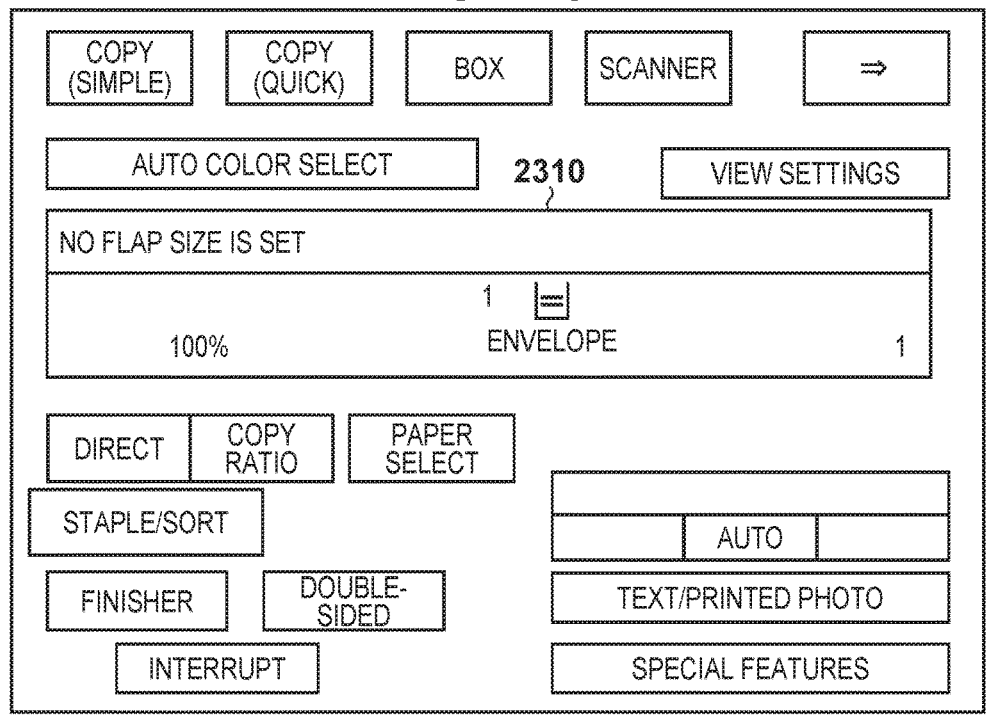
FIG. 23B is a view exemplifying a warning screen when no flap size is set in a copy job.

FIG. 23B shows a copy setting screen. By displaying a message 2310 "NO FLAP SIZE IS SET," the user can be warned that no flap size is set.

If the CPU 201 determines in step S2110 that the paper size is not the envelope size, or if the flap size is larger than the threshold in step S2111, the processing in step S2112 is not performed. This sequence is executed every time the copy setting contents are changed from the operation unit 106. The user can be warned about whether a proper flap size is set.

As described above, according to the embodiment, even in copy processing, similar to the case of receiving PDL data, an image corresponding to the size of the flap (margin) of an envelope can be printed. Even in long-edge feed, an image can be printed appropriately on an envelope.

Even when an envelope is set in the manual feed tray to convey it by long-edge feed, an image can be printed at a proper position in accordance with the flap size of the envelope. As a result, even if image data of a size not including the flap size is input by a PDL job, an image can be printed at a proper position without printing the image on the flap.

For a copy job, an image of a size including a set flap size is read. Appropriate image data can therefore be used and printed from an original set on the scanner, greatly improving user friendliness.

Other Embodiments

The above-described embodiment has explained processing of not shifting the image of a read original by the flap size in consideration of a case in which an envelope is placed on the original table with its flap opened. However, the present invention is not limited to this, and processing of shifting the image of a read original by the flap size and printing it may be executed in copying. In copying, the user may set in advance whether to shift the image of a read original by the flap size and print it. In accordance with the setting, it may be decided whether to shift and print the image.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264121, filed Dec. 1, 2011, which is hereby incorporated by reference herein in its entirety.

What is claimed is:

1. An image forming apparatus comprising:
a stacker on which an envelope is to be stacked, the envelope comprising a flap and a body portion;

an image forming device configured to form an image on the envelope conveyed from the stacker;

an operation device configured to display a screen for prompting a user to set a size of the envelope and an orientation of the envelop to be stacked on the stacker, and configured to accept the size of the envelope and the orientation of the envelope based on a user instruction, wherein the orientation of the envelope accepted by the operation device is one of a first orientation, in which the flap and the body portion are aligned in a width direction that is orthogonal to a conveyance direction of the envelope, and a second orientation, in which the flap and the body portion are aligned in the conveyance direction of the envelope; and a controller configured to control the operation device to display a guidance image based on the size of the envelope and the orientation of the envelope accepted by the operation device, wherein, in a case in which the first orientation is accepted by the operation device, the guidance image is an image for prompting a user to place the envelope such that the flap is positioned farther from a front side of the image forming apparatus in the width direction than the body portion, and, in a case in which the second orientation is accepted by the operation device, the guidance image is an image for prompting the user to place the envelope such that the flap is positioned upstream of the body portion in the conveyance direction.

2. The apparatus according to claim 1, wherein the stacker is a manual feed tray.

3. The apparatus according to claim 1, wherein the stacker is a paper cassette.

4. The apparatus according to claim 1, wherein the envelope is stacked on the stacker with the flap of the envelope opened.

5. The apparatus according to claim 1, wherein the guidance image is displayed such that a position of the flap of the envelope is distinguished.

6. The apparatus according to claim 1, further comprising a sensor configured to detect that the envelope is placed on the stacker,
wherein the controller controls the operation device to display, based on a detection result of the sensor, the screen.

7. The apparatus according to claim 1, wherein the size of the envelope is selected from a plurality of standard sizes.

8. The apparatus according to claim 1, wherein the stacker is able to stack a sheet different from the envelope.

9. The apparatus according to claim 1, wherein the controller receives a job that designates a sheet size, and, in a case in which the sheet size designated in the received job matches the size of the envelope accepted by the operation device, the controller controls the image forming device to form the image on the envelope conveyed from the stacker.

10. The apparatus according to claim 1, wherein the guidance image is displayed such that a border between the flap and the body portion of the envelope is able to be identified.

11. An image forming apparatus comprising:
a stacker on which an envelope is to be stacked, the envelope comprising a flap and a body portion;
an image forming device configured to form an image on the envelope conveyed from the stacker;
an operation device configured to display a screen for prompting a user to set a size of the envelope and an orientation of the envelope to be stacked on the stacker and configured to accept the size of the envelope and the orientation of the envelope based on a user instruction, the orientation being one of a plurality of orientations including a first orientation and a second orientation, wherein the first orientation is an orientation in which the flap and the body portion are aligned in a width direction that is orthogonal to a conveyance direction of the envelope, and the second orientation is an orientation in which the flap and the body portion are aligned in the conveyance direction of the envelope; and
a controller configured to control the operation device to display a guidance image based on the size of the envelope and the orientation of the envelope accepted by the operation device,
wherein, in a case in which the first orientation is accepted by the operation device, the guidance image is an image for prompting a user to place the envelope such that the flap and the body portion are aligned in the width direction, and, in a case in which the second orientation is accepted by the operation device, the guidance image is an image for prompting the user to place the envelope such that the flap is positioned upstream of the body portion in the conveyance direction.

12. The apparatus according to claim 11, wherein the guidance image is displayed such that a border between the flap and the body portion of the envelope is able to be identified.

13. A non-transitory computer-readable storage medium storing a program causing a controlling apparatus, which controls an image forming apparatus comprising a stacker on which an envelope is to be stacked, the envelope comprising a flap and a body portion, and an image forming device configured to form an image on the envelope conveyed from the stacker, to execute:
displaying a screen for prompting a user to set a size of the envelope and an orientation of the envelope to be stacked on the stacker;
accepting the size of the envelope and the orientation of the envelope based on a user instruction, the orientation being one of a plurality of orientations including a first orientation and a second orientation, wherein the first orientation is an orientation in which the flap and the body portion are aligned in a width direction that is orthogonal to a conveyance direction of the envelope, and the second orientation is an orientation in which the flap and the body portion are aligned in the conveyance direction of the envelope; and
displaying a guidance image based on the size of the envelope and the orientation of the envelope accepted by the operation device,
wherein, in a case in which the first orientation is accepted by the operation device, the guidance image is an image for prompting a user to place the envelope such that the flap and the body portion are aligned in the width direction, and, in a case in which the second orientation is accepted by the operation device, the guidance image is an image for prompting the user to place the envelope such that the flap is positioned upstream of the body portion in the conveyance direction.

* * * * *